(12) United States Patent
Izumi et al.

(10) Patent No.: US 7,126,246 B2
(45) Date of Patent: Oct. 24, 2006

(54) ROTARY ELECTRIC MACHINE WITH STATOR HAVING AN ANNULAR ARRAY OF POLES

(75) Inventors: Yoshiyuki Izumi, Tochigi-ken (JP); Hiroshi Sakakibara, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/513,930

(22) PCT Filed: May 8, 2003

(86) PCT No.: PCT/JP03/05742

§ 371 (c)(1),
(2), (4) Date: Nov. 10, 2004

(87) PCT Pub. No.: WO03/096515

PCT Pub. Date: Nov. 20, 2003

(65) Prior Publication Data

US 2006/0033395 A1 Feb. 16, 2006

(30) Foreign Application Priority Data

May 13, 2002 (JP) .............................. 2002-136689

(51) Int. Cl.
*H02K 3/18* (2006.01)
*H02K 15/00* (2006.01)
(52) U.S. Cl. ...................................... 310/208; 310/180
(58) Field of Classification Search ................ 310/216, 310/208, 194, 218, 259, 179, 180
See application file for complete search history.

(56) References Cited

U.S. PATENT DOCUMENTS

| 2,947,894 | A | * | 8/1960 | Strang et al. | 310/202 |
| 3,421,033 | A | * | 1/1969 | Hoffmeyer | 310/172 |
| 4,780,635 | A | * | 10/1988 | Neumann | 310/216 |
| 6,218,758 | B1 | | 4/2001 | Miura et al. | |
| 6,291,918 | B1 | * | 9/2001 | Umeda et al. | 310/215 |
| 6,335,582 | B1 | * | 1/2002 | Abukawa et al. | 310/214 |
| 6,741,009 | B1 | * | 5/2004 | Ando et al. | 310/254 |
| 2002/0047460 | A1 | * | 4/2002 | Yoneda et al. | 310/216 |
| 2004/0201303 | A1 | * | 10/2004 | Zhang et al. | 310/216 |

FOREIGN PATENT DOCUMENTS

| CA | 2 458 833 A1 | 3/2003 |
| EP | 1 215 800 A2 | 6/2002 |
| JP | 4-150749 A | 5/1992 |
| JP | 9-84287 A | 3/1997 |
| JP | 10-174331 A | 6/1998 |
| JP | 11-32457 A | 2/1999 |
| JP | 2000-14066 A | 1/2000 |
| JP | 2002-112483 A | 4/2002 |
| JP | 2002-186205 A | 6/2002 |

(Continued)

*Primary Examiner*—Darren Schuberg
*Assistant Examiner*—Erik Preston

(74) *Attorney, Agent, or Firm*—Birch, Stewart, Kolasch & Birch, LLP

(57) ABSTRACT

Coils in respective poles are all wound in the same shape. The coils are wound such that one of the winding ends in a predetermined layers, for a single turn, is passes to an adjacent layer, or single turns at the winding ends in a predetermined layer are wound to different adjacent positions, whereby the cross-sectional shape of the coils is unsymmetrical. The coils are wound such that part of each coil crosses or contacts an intermediate line bisecting the angle formed between the axes of the coils.

14 Claims, 23 Drawing Sheets

FOREIGN PATENT DOCUMENTS

| | | |
|---|---|---|
| JP | 2002-354738 A | 12/2002 |
| JP | 2003-79079 A | 3/2003 |
| JP | 2003-102136 A | 4/2003 |

* cited by examiner

ROTARY ELECTRIC MACHINE WITH STATOR HAVING AN ANNULAR ARRAY OF POLES

TECHNICAL FIELD

The present invention relates to a rotary electric machine such as a motor or a generator, for example, and more particularly to a rotary electric machine having a stator which comprises an annular array of poles with respective coils wound therearound.

BACKGROUND ART

Stators of rotary electric machines have a plurality of split cores. Each of the split cores comprises an arcuate yoke and a pole extending radially inwardly from the stator, with a coil wound on the pole.

The rotary electric machines with such stators are required to maximize the volume that the coil takes up in a slot defined between adjacent split cores. To meet such a requirement, it is necessary to wind more turns of the coils around the respective split cores. There have been proposed conventional techniques, described below, for increasing the volume that the coil takes up in each slot.

According to the first conventional technique, coils are wound around adjacent cores such that the coils have different cross-sectional shapes, filling slots defined between the cores with the coils (see Japanese Laid-Open Patent Publication No. 2000-14066 and Japanese Laid-Open Patent Publication No. 11-32457).

According to the second conventional technique, the width of a coil that is first inserted into a slot defined between adjacent cores is set to ½ or more of the opening width of the slot, and the coil has a slanted cross-sectional shape to avoid interference between the coil and a coil that is subsequently inserted into the slot (see Japanese Laid-Open Patent Publication No. 4-150749).

According to the third conventional technique, coils wound respectively around adjacent cores have different cross-sectional shapes (see Japanese Laid-Open Patent Publication No. 9-84287 and Japanese Laid-Open Patent Publication No. 10-174331). Specifically, one of the coils has a width that is progressively smaller toward the axis of the stator (the rotational axis of the rotary electric machine), and the other coil has an elongate rectangular cross-sectional shape and is inserted into a slot.

DISCLOSURE OF THE INVENTION

It is an object of the present invention to provide a rotary electric machine having coils that take up an increased volume with respect to cores, thereby lowering the cost of a facility, reducing the number of assembling steps, and facilitating inventory control.

According to the present invention, a rotary electric machine having a stator having an annular array of poles with respective coils wound therearound is wherein each of the coils is wound in an asymmetrical cross-sectional shape with respect to the poles in a plane perpendicular to the axis of the stator.

Using coils each having an asymmetrical cross-sectional shape, a rotary electric machine having a stator having coils taking up an increased volume can be constructed of a single type of poles.

The coils may have portions extending beyond or held in contact with a medium line or an intermediate line which divides the angle formed between the axes of adjacent coils into two equal angles, in the plane perpendicular to the axis of the stator. Alternatively, one of adjacent ones of the coils may have a portion extending beyond or held in contact with a tangential line interconnecting ends of adjacent layers of the other one of the adjacent ones of the coils, in the plane perpendicular to the axis of the stator. With this arrangement, the volume that the coils take up may further be increased.

BEST MODE FOR CARRYING OUT THE INVENTION

Figure 1:
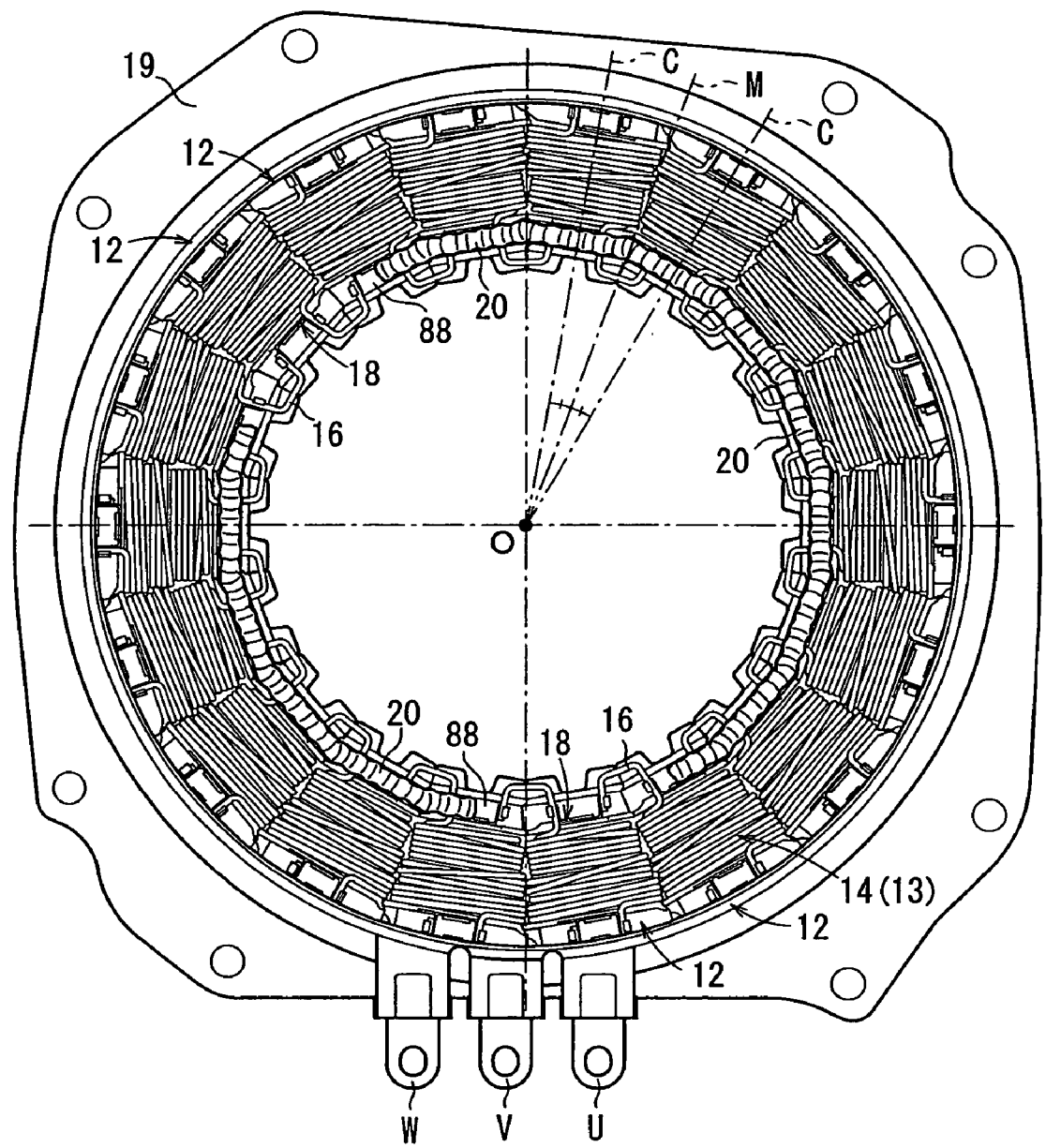
FIG. 1 is a plan view, with a sealant partly omitted from illustration, of the stator of a rotary electric machine according to an embodiment of the present invention.
Figure 2:
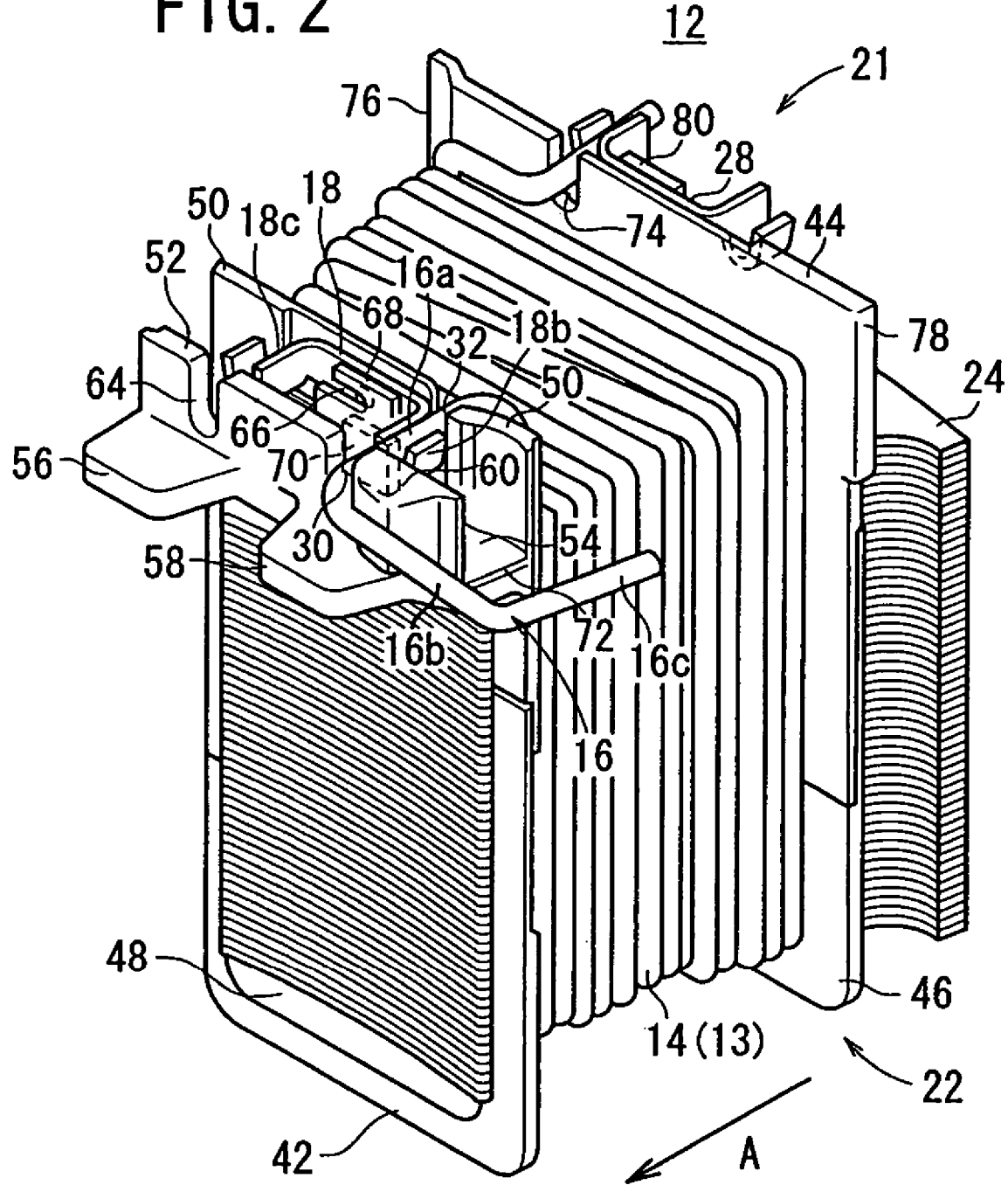
FIG. 2 is a perspective view of a split core to be assembled in the stator.

As shown in FIG. 1, a stator 10 according an embodiment of the present invention comprises a stator with coils connected in a so-called three-phase Y connection, and has input terminals U, V, W of the Y connection and eighteen split cores 12.

As shown in FIGS. 2 through 5, each of the split cores 12 before assembled into the stator 10 comprises a laminated steel plate assembly 24 made of a stack of steel plates that are stamped out to a substantially T-shape by a press, insulators 21, 22 insulating the laminated steel plate assembly 24 from the exterior, a coil 14 wound around the laminated steel plate assembly 24 with the insulators 21, 22 interposed therebetween, and terminals 18, 28 made of metal.

As described above, the laminated steel plate assembly 24 has a substantially T-shape and has a portion 24a corresponding to the upper side of the "T" shape and serving as a yoke of the stator. The laminated steel plate assembly 24 also has a portion 24b corresponding to a lower extension of the "T" shape and serving as a pole (or a salient pole) of the stator 10.

The coil 14 comprises a wire 13 having an insulating film. The coils 14 disposed on a radially inner side of the stator 10 (in the direction indicated by the arrow A) have ends serving as extensions 16 that are electrically connected to each other by the terminals 18 of the split cores 12. Therefore, the terminals 18 form a neutral point of the Y connection. The other ends of the coils 14 which are disposed on a radially outer side of the stator 10 (in the direction opposite to the direction indicated by the arrow A) are connected to either one of the input terminals U, V, W through an annular input line bus bar (not shown). Specifically, the other ends of the coils 14, which are wound around six split cores 12 that are disposed as every three split cores, are connected to the input terminal U. The other ends of the coils 14 which are wound around six split cores 12 that are disposed as every three split cores, different from the above six split cores 12, are connected to the input terminal V. Furthermore, the other ends of the coils 14, which are wound around the remaining six split cores 12, are connected to the input terminal W. The split cores 12, the input terminals U, V, W, and the input line bus bar are assembled on a hollow housing (or case) 19 (see FIG. 1).

The terminals 18 are located in an annular groove 88 to be described later and insulated by a sealant 20 filled in the annular groove 88.

As described above, the split cores 12 are constructed of the terminals 18 of metal fixing the extensions 16 as ends of the coils 14 disposed on the radially inner side of the stator 10 and electrically connected to the coils 14, and the terminals 28 of metal fixing the other ends of the coils 14 disposed on the radially outer side of the stator 10 and electrically connected to the coils 14. The terminals 18 and the terminals 28 are made of the same material.

Each of the extensions 16 has a first extension 16a extending in the radially inward direction of the stator 10, a second extension 16b extending from the first extension 16a in a circumferential direction of the stator 10, and a third extension 16c extending from the second extension 16b in the radially outward direction of the stator 10. Therefore, the extension 16 is of a curved and bent structure. The terminal 18 has a first fixing portion 18b on one end thereof, two recesses 30, 32 are formed in front of and behind the first fixing portion 18b (in the direction indicated by the arrow A). The first extension 16a has a base portion positionally fixed by the first fixing portion 18b and electrically connected to the first fixing portion 18b, and guided by the two recesses 30, 32 in the direction indicated by the arrow A.

The second extension 16b is curved or bent perpendicularly to the first extension 16a, and the third extension 16c extends perpendicularly to the second extension 16b. Actually, the first extension 16a, the second extension 16b, and the third extension 16c are disposed in the same hypothetical plane.

Figure 3:
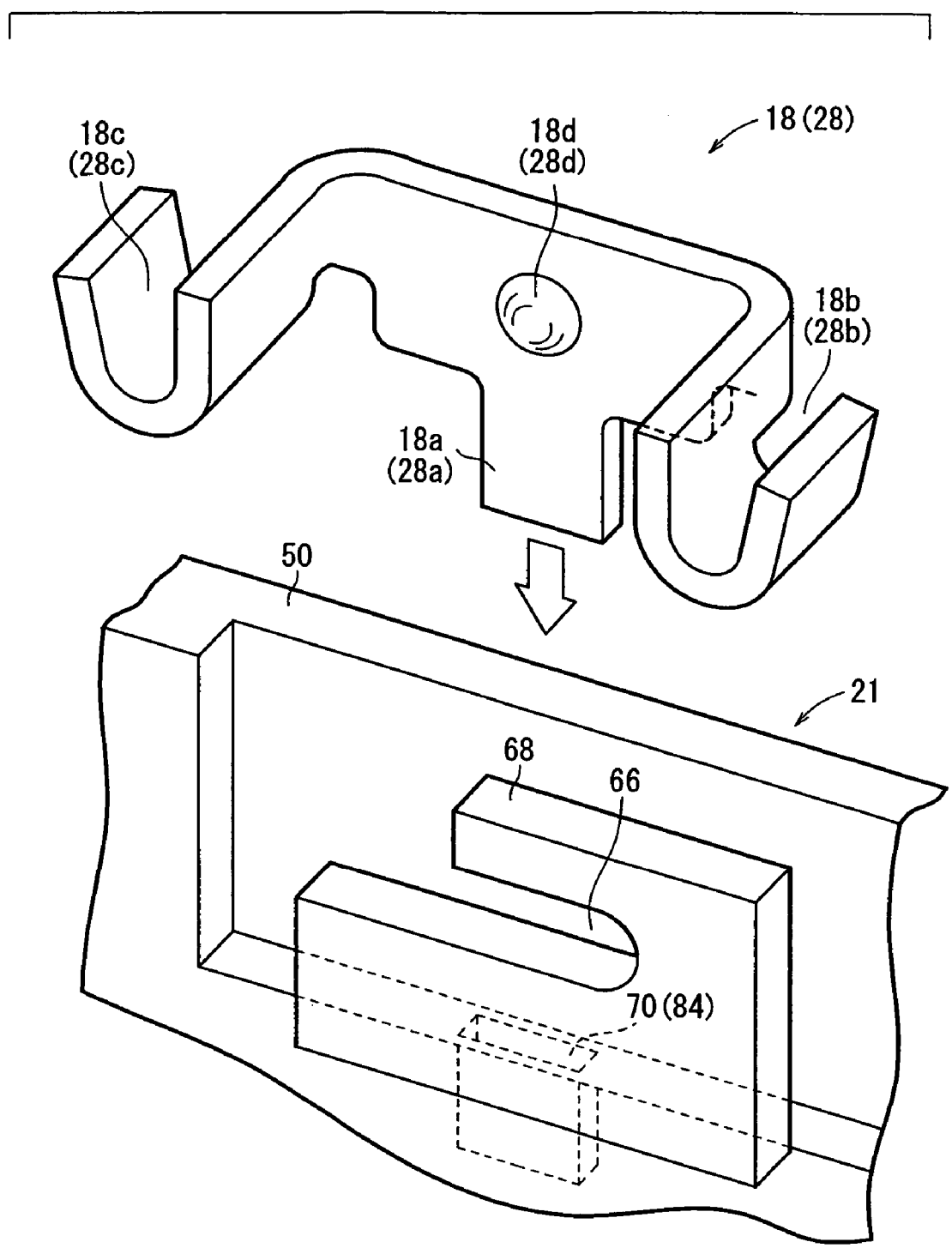
FIG. 3 is a perspective view, partly cut away, of a terminal and an insulator on which the terminal is assembled.
Figure 4:
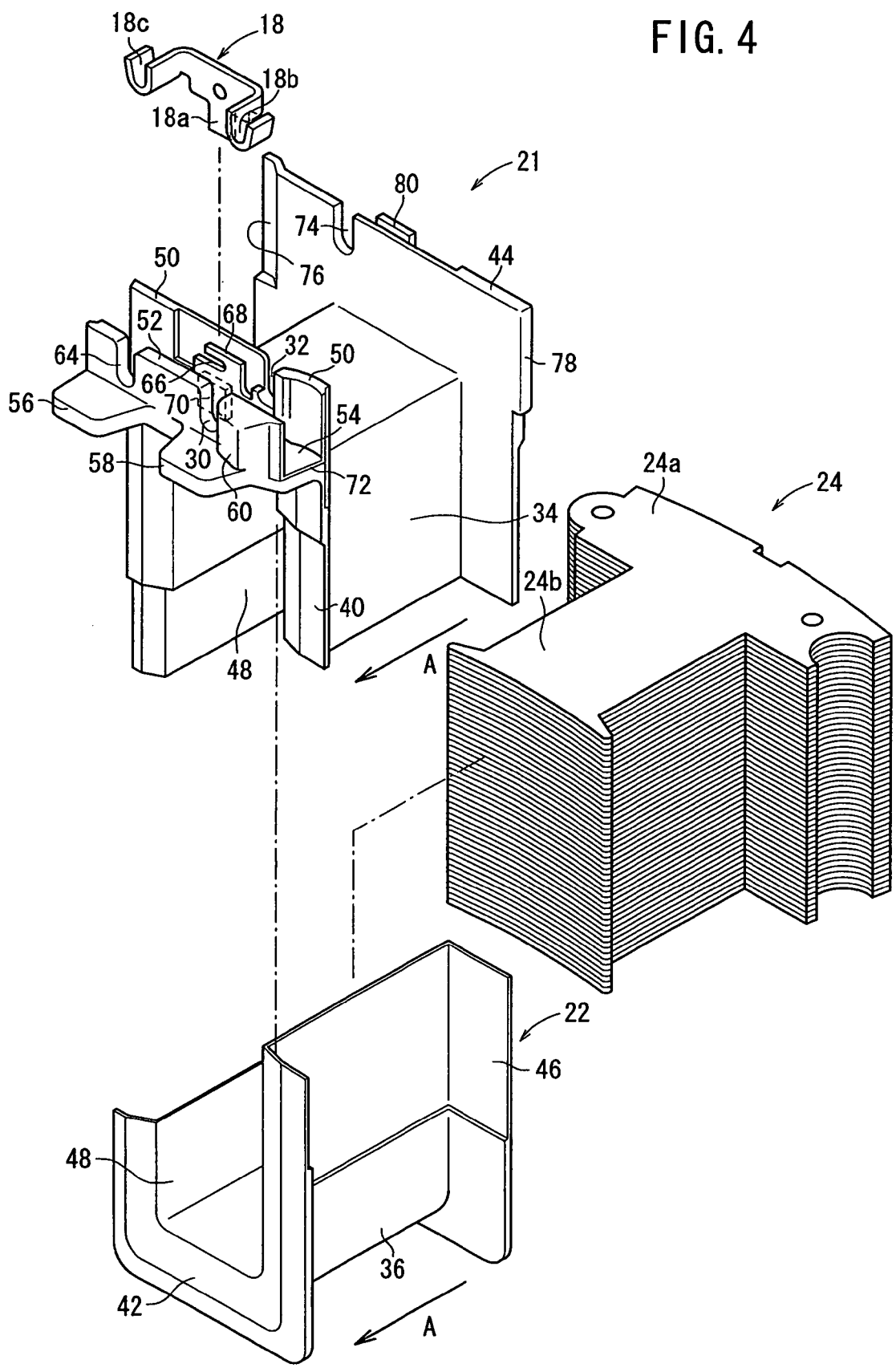
FIG. 4 is a perspective view of insulators, terminals, and a laminated steel plate assembly.
Figure 5:
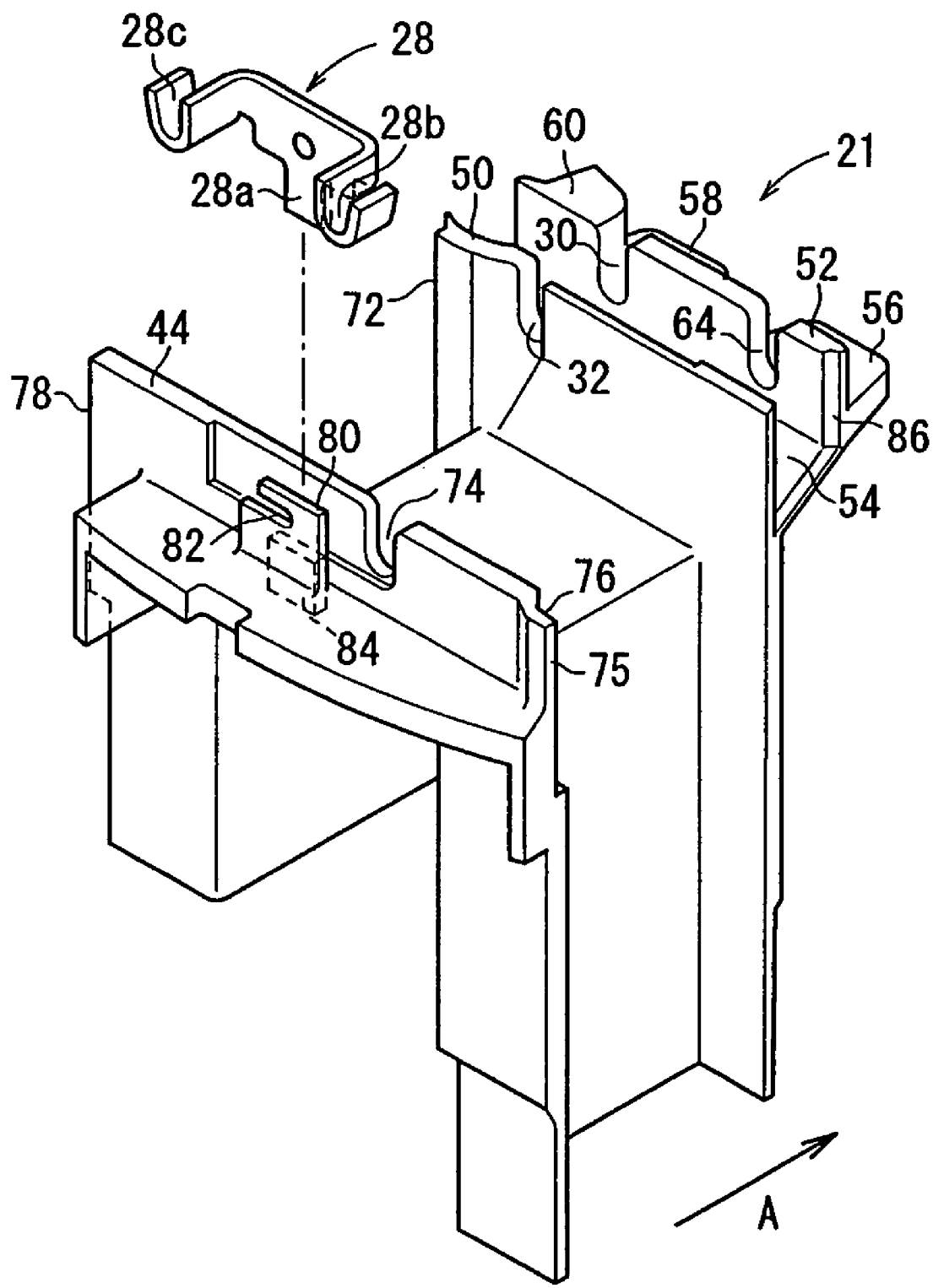
FIG. 5 is a perspective view of the insulator and the terminal as viewed from a radially outward direction.

As shown in FIGS. 3 through 5, the terminal 18 (and 28) comprises a substantially T-shaped metal terminal and has an insert 18a (28a) to be inserted into a slot 70 (84) in the insulator 21, the first fixing portion 18b (28b) disposed on one end of the terminal 18 for fixing the first extension 16a, and a second fixing portion 18c (28c) disposed on the other end of the terminal 18 for fixing the third extension 16c of another adjacent split core 12. The terminal 18 (28) also has a small boss (engaging portion) 18d (28d) formed by a press such as a punch or the like.

As shown in FIG. 4, the insulator 21 has a coil winding portion 34 for winding the coil 14 therearound, a peripheral wall 40 disposed on the radially inner side of the stator 10 perpendicularly to the plane of the coil winding portion 34, and a peripheral wall 44 disposed on the radially outer side of the stator 10 perpendicularly to the plane of the coil winding portion 34. The insulator 22 has a coil winding portion 36 for winding the coil 14 therearound, a peripheral wall 42 disposed on the radially inner side of the stator 10 perpendicularly to the plane of the coil winding portion 36, and a peripheral wall 46 disposed on the radially outer side of the stator 10 perpendicularly to the plane of the coil winding portion 36. When the insulator 22 is inserted upwardly into the insulator 21, a portion of the coil winding portion 34 and a portion of the coil winding portion 36 overlaps and are coupled to each other, a portion of the peripheral wall 40 and a portion of the peripheral wall 42 overlaps and are coupled to each other, and a portion of the peripheral wall 44 and a portion of the peripheral wall 46 overlaps and are coupled to each other. The insulators 21, 22 are thus integrally combined with each other, forming a hole 48 within the integrally combined insulators 21, 22. The laminated steel plate assembly 24, which is made of a stack of steel plates, is inserted into the hole 48, thereby electrically insulating the laminated steel plate assembly 24 from the coil 14.

The insulator 21 has, on a radially inner upper section (opposite to the insulator 22 disposed in a lower section), a first upward wall 50 serving as part of the peripheral wall 40 and extending vertically along the axis of the stator 10 (the rotational axis of the rotary electric machine), a second upward wall 52 spaced from the first upward wall 50 in the radially inward direction of the stator 10 and extending substantially parallel to the first upward wall 50, and a joint surface 54 interconnecting the lower end of the first upward wall 50 and the lower end of the second upward wall 52.

The insulator 21 has two bases 56, 58 extending in the radially inward direction of the stator 10 from respective left and right portions of the lower end of the second upward wall 52. On the right-hand (hereinafter simply referred to as "right", and an opposite left-hand side of right as "left") base 58 in FIG. 4, a portion of the second upward wall 52 is thicker than the other portion of the second upward wall 52, providing a side of the recess 30. The thicker portion serves as a guide portion 60 for guiding the extension 16 of the coil 14 in the direction in which it extends (in the direction indicated by the arrow A).

The second upward wall 52 has a recess 64 defined in a left portion thereof and positioned in symmetrical relation to the recess 30. The recess 32 is defined in the first upward wall 50 which is present radially outwardly (in the direction opposite to the direction indicated by the arrow A) of the second upward wall 52 having the recess 30 with respect to the stator 10.

A tooth 68 having a recess (engaged portion) 66 defined in the circumferential direction of the stator 10 is disposed vertically on the first upward wall 50 on the radially inner side of the stator 10. A slot 70 is defined between the tooth 68 and the first upward wall 50.

A protrusion 72 projects to the right from the guide portion 60, the joint surface 54, and the first upward wall 50.

FIG. 5 shows the insulator 21 illustrated in FIG. 4, as viewed from obliquely above its rear side. As shown in FIG. 5, the peripheral wall 44 has a recess 74 defined therein at a position leftward of the center thereof (rightward in FIG. 5) for passing the other end of the coil 14 therethrough. The peripheral wall 44 also has a flaring portion 75 disposed on a left end thereof (right end in FIG. 5) and projecting in the radially outward direction of the stator 10, providing a dent 76 defined in the left end of the peripheral wall 44 in the radially inward direction of the stator 10. The peripheral wall 44 has a protrusion 78 disposed on a right end thereof (left end in FIG. 5) and projecting to the right of the peripheral wall 44. The protrusion 78 fits in the dent 76 of an adjacent split core 12.

A tooth 80, which is of substantially the same shape as the tooth 68, is disposed vertically radially outwardly (in the direction opposite to the direction indicated by the arrow A) of the peripheral wall 44 in a central region along the circumferential direction of the stator 10. The tooth 80 has a recess 82 defined therein which extends in the circumferential direction of the stator 10. A slot 84, which is of substantially the same shape as the slot 70, is defined between the tooth 80 and the peripheral wall 44.

The joint surface 54, the first upward wall 50, and the second upward wall 52 have left ends whose inner surfaces are convex, providing a dent 86. The dent 86 is shaped to fit over the protrusion 72.

If the insulators 21, 22 are made of PPS (polyphenylene sulfide), then they provide excellent heat resistance, mechanical strength, rigidity, electric insulation, dimensional stability, and creep resistance.

A process of assembling the split core 12 of the insulators 21, 22, the terminals 18, 28, the laminated steel plate assembly 24, and the coil 14 will be described below.

First, the insert 18a of the terminal 18 is inserted into the slot 70 (see FIG. 3) in the insulator 21. Since the small boss 18d of the terminal 18 engages in the recess 66 in the tooth 68, the insulator 21 is prevented from being dislodged from the terminal 18. Similarly, the insert 28a of the terminal 28 is inserted into the slot 84 (see FIG. 3) in the insulator 21. The small boss 28d engages in the recess 82, preventing the insulator 21 from being dislodged from the terminal 28.

Then, the laminated steel plate assembly 24, which is made up of a stack of steel plates, is inserted into the hole 48 (see FIG. 4) that is defined by the insulators 21, 22.

Figure 6:
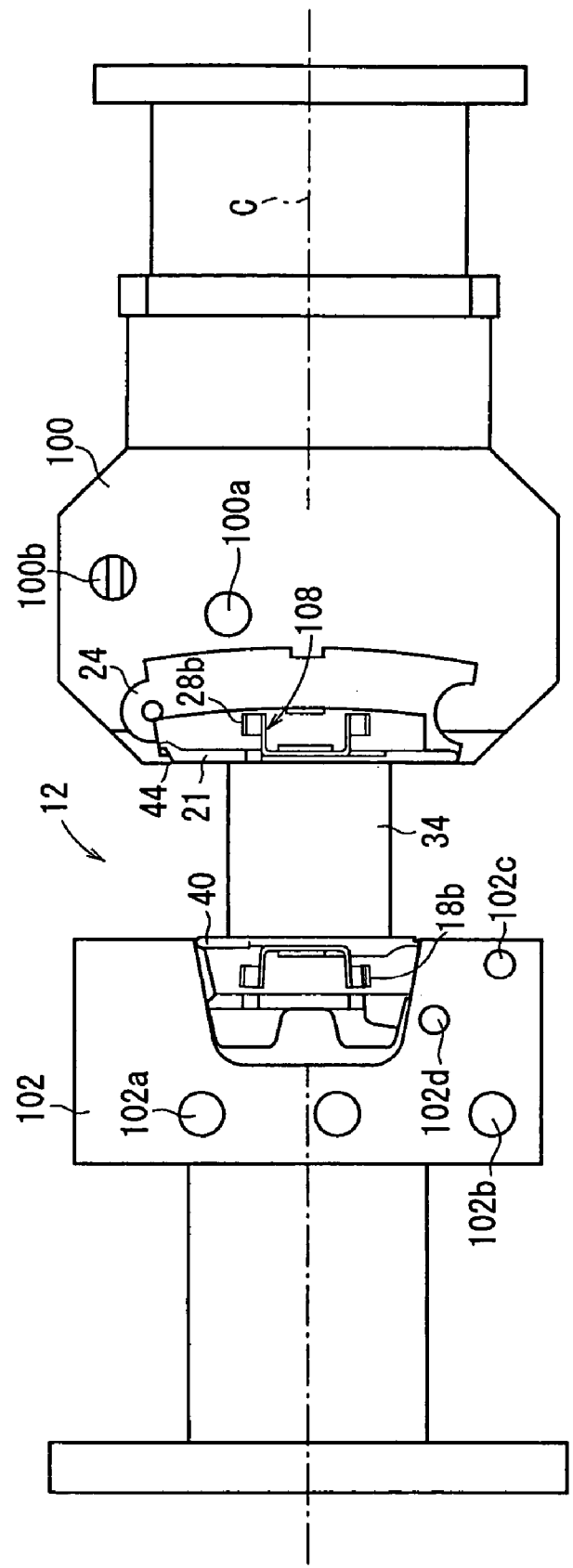
FIG. 6 is a plan view showing the manner in which a split core is fixed to a jig before a coil is wound around the split core.

Then, the blank wire 13 is wound around the coil winding portions 34, 36, forming the coil 14. Specifically, as shown in FIG. 6, with the laminated steel plate assembly 24 inserted in the hole 48, the insulators 21, 22 are fixed in position by a first jig 100 and a second jig 102. The first jig 100 holds the radially outer side of the insulator 21, i.e., the peripheral wall 44 thereof. The first jig 100 can be rotated about an axis C by a winding motor (not shown). The second jig 102 holds the radially inner side of the insulator 21, i.e., the peripheral wall 40 thereof.

Figure 7:
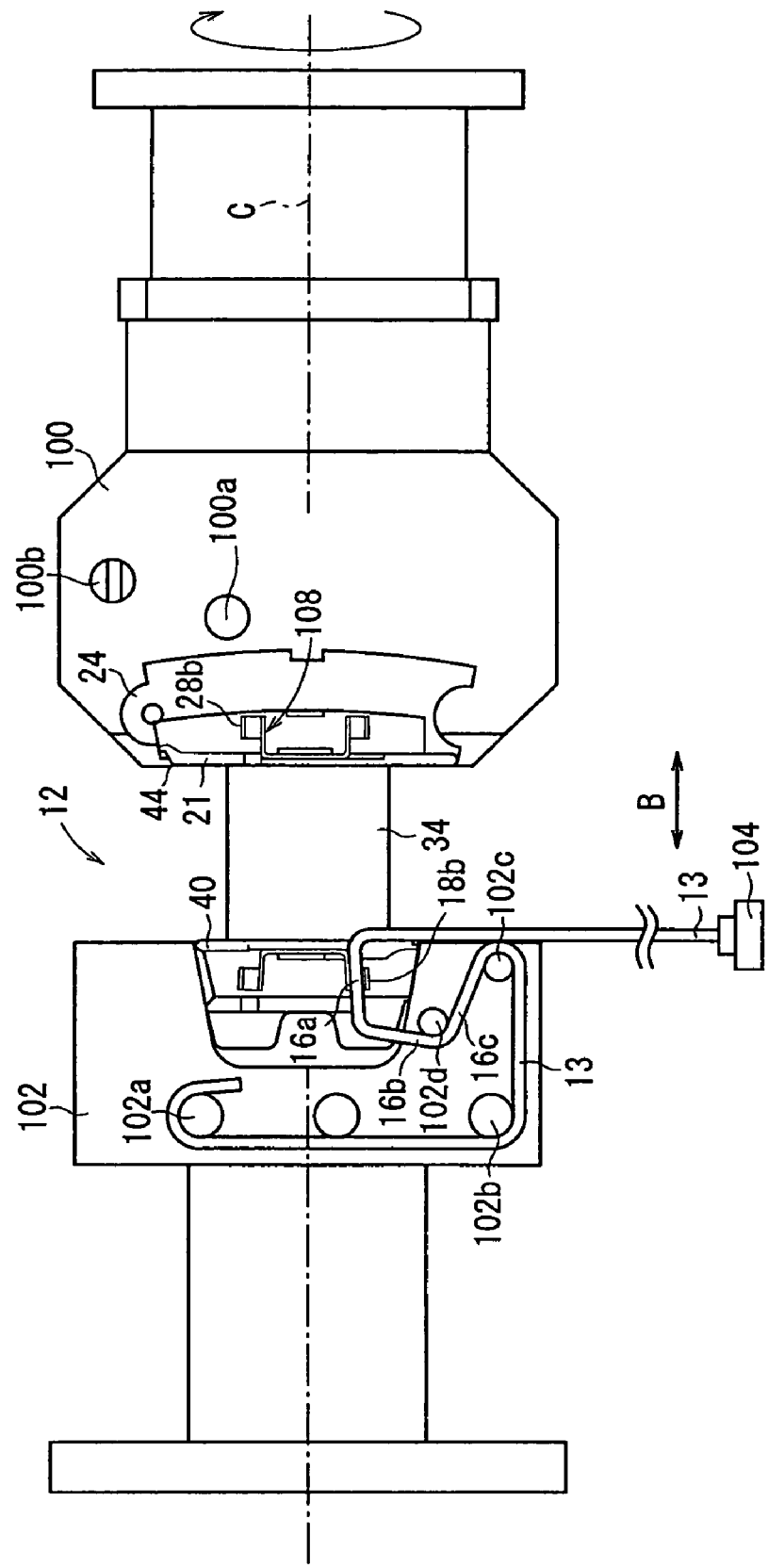
FIG. 7 is a plan view showing a state immediately before a coil is wound around a split core.

As shown in FIG. 7, the blank wire 13 is twined successively around pins 102a through 102d mounted on the upper surface of the second jig 102 by a blank wire guide mechanism (not shown). The end of the blank wire 13 that extends ahead of the pin 102a is fixed integrally to the second jig 102 by a chuck (not shown). The blank wire guide mechanism guides the blank wire 13 along the side of the guide portion 60, and also guides the blank wire 13 through the recess 30, the fist fixing portion 18b, and the recess 32 toward the coil winding portions 34, 36. At this time, the relative positions and shapes of the pins 102c, 102d and the guide portion 60 form the first extension 16a, the second extension 16b, and the third extension 16c.

The end of the blank wire 13 that is guided to the coil winding portions 34, 36 extends from a blank wire supply 104. The blank wire supply 104 is movable back and forth in the directions indicated by the arrow B parallel to the axis C. The distance that the blank wire supply 104 is movable back and forth can be controlled in synchronism with the angular displacement of the winding motor.

The winding motor then rotates the first and second jigs 100, 102 and the insulators 21, 22 about the axis C. At this time, the blank wire supply 104 is moved back and forth in the directions indicated by the arrow B depending on the angular displacement of the winding motor, winding the blank wire 13 around the coil winding portions 34, 36.

Figure 8:
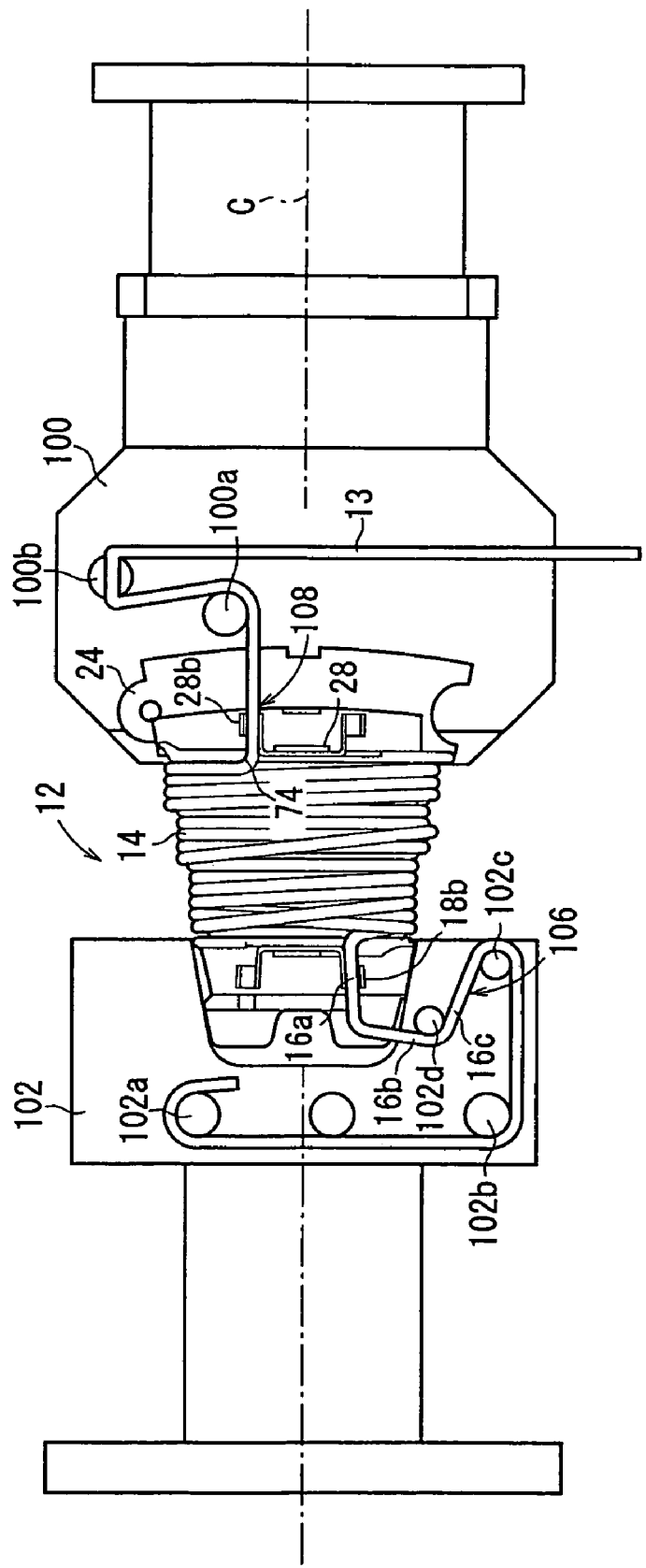
FIG. 8 is a plan view showing a process of cutting a blank wire after the coil is wound around the split core.

Then, as shown in FIG. 8, after the blank wire 13 is wound into the coil 14, the blank wire guide mechanism guides the blank wire 13 through the recess 74 and the first fixing portion 28b and around pins 100a, 100b. The blank wire 13 is guided to pass through a groove defined centrally in the pin 100b.

Then, the opposite ends of the blank wire 13 which extend from the coil 14 are temporarily fixed by the first fixing portion 18b of the terminal 18 and the second fixing portion 28b of the terminal 28.

The opposite ends of the blank wire 13 which extend from the coil 14 are cut off at cut-off regions 106, 108. The cut-off region 106 is located between the pins 102c, 102d. The location where the third extension 16c is positioned at the second fixing portion 18c of an adjacent split core 12 when the split core 12 is assembled on the stator 10 is preferable for use as the cut-off region 106a. The cut-off region 108 is located radially outwardly of the first fixing portion 28b.

Thereafter, the split core 12 is removed from the first jig 100 and the second jig 102. The process of winding the coil 14 is now finished.

Then, a process of winding the blank wire 13 into the coil 14 around the coil winding portions 34, 36 will be described in greater detail with reference to FIGS. 9 through 15. In FIGS. 9 through 15, the first jig 100, the second jig 102, and the blank wire supply 104 are omitted from illustration for an easier understanding. In FIGS. 9 through 15, the direction indicated by the arrow A is referred to as a downward direction, and the direction opposite thereto as an upward direction. In the description which follows, a first turn of a first layer of the coil 14 is referred to as a turn A1, and second and following turns thereof as a turn A2, a turn A3, . . . . A first turn of a second layer of the coil 14 is referred to as a turn B1, and second and following turns thereof as a turn B2, a turn B3, . . . . Similarly, turns of a third layer are referred to as turns Cn (n=1, 2, 3, . . . ), turns of a fourth layer as turns Dn, and turns of a fifth layer as turns En.

Figure 9:
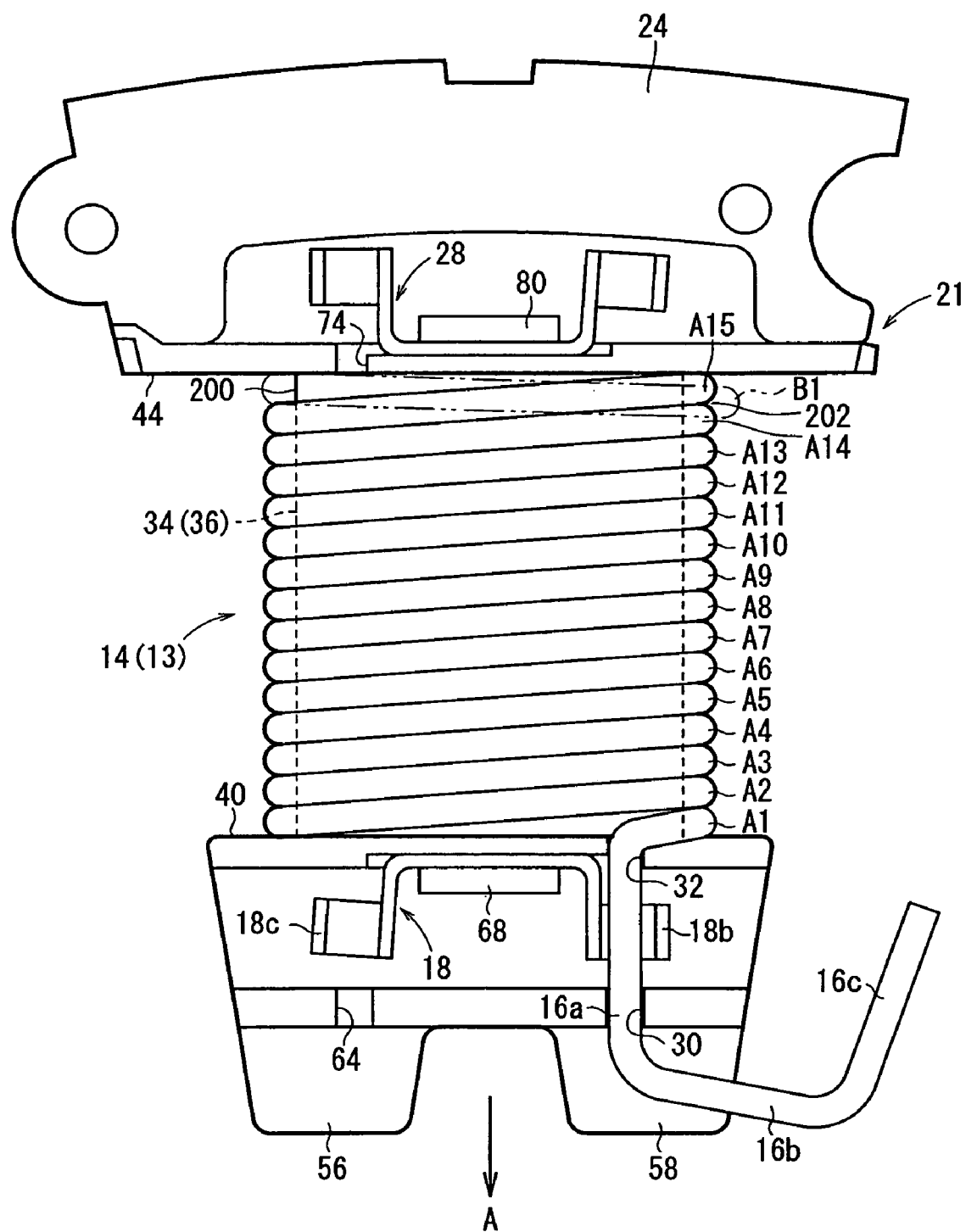
FIG. 9 is a plan view, partly omitted from illustration, showing a process of winding a first layer of turns around the split core.

As shown in FIG. 9, turns A1 through A15 of the first layer are wound successively upwardly in an array. The fifteen turns of the first layer thus wound cover the coil winding portions 34, 36 (see FIG. 4) with the blank wire 13 substantially free of gaps.

Then, the blank wire 13 is guided from a grove 200 defined on the left between the turn A15 and the peripheral wall 44 to an aligning groove 202 that is defined on the right by the turn A15 and the turn A14 of the first layer, starting to wind the turn B1 of the second layer. The turn B1 can stably be wound as it is wound along the aligning groove 202.

Figure 10:
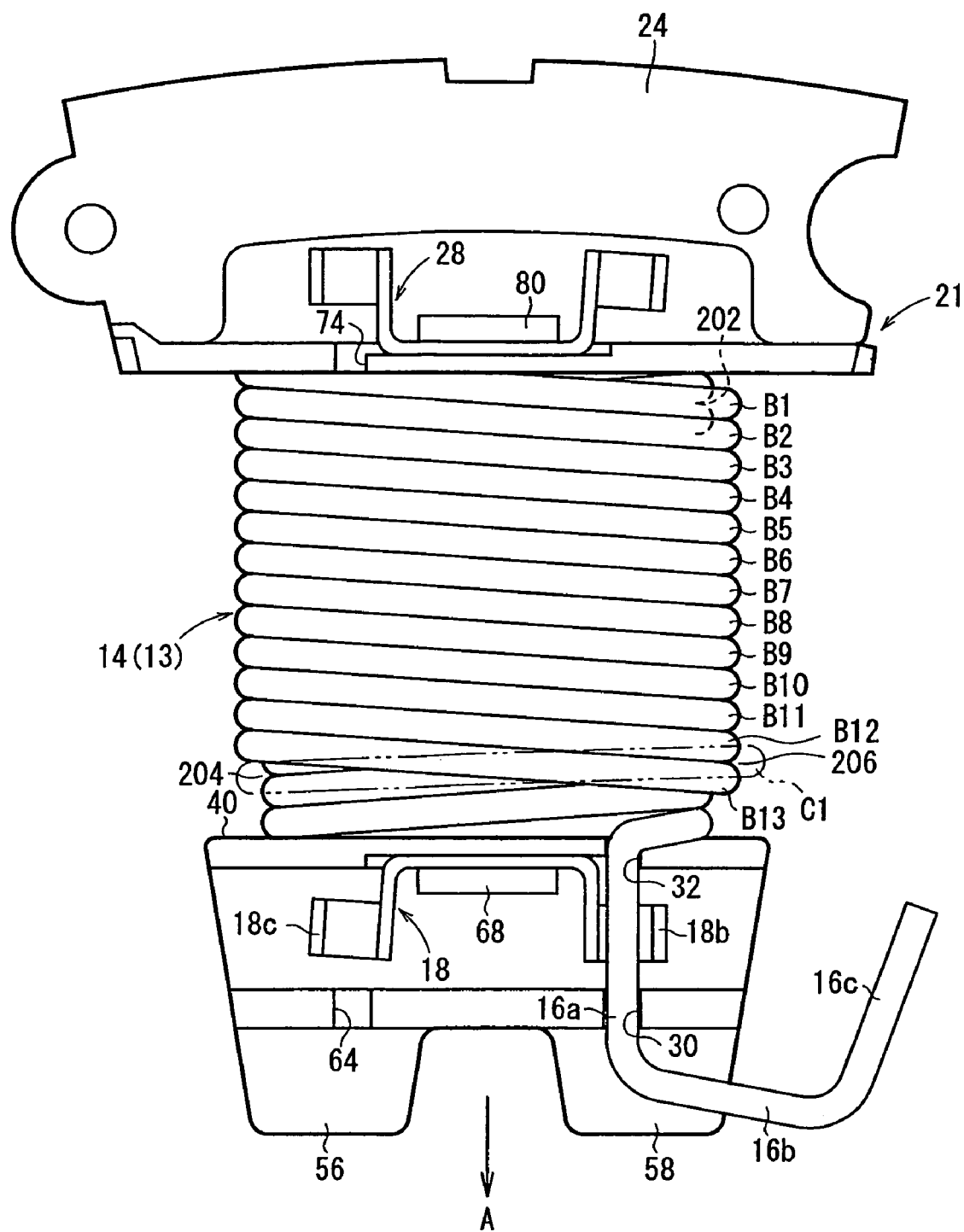
FIG. 10 is a plan view, partly omitted from illustration, showing a process of winding a second layer of turns around the split core.

Thereafter, as shown in FIG. 10, the turns B1 through B13 (final turn of the second layer) of the second layer are wound successively downwardly in an array.

Then, the blank wire 13 is guided from a grove 204 positioned on the left directly below the turn B13 to an aligning groove 206 that is defined on the right by the turn B12 and the turn B13 of the second layer, starting to wind the turn C1 of the third layer. At this time, the turn C1 is guided across the turn B13. The turn C1 can stably be wound as it is positioned in the aligning groove 206.

Figure 11:
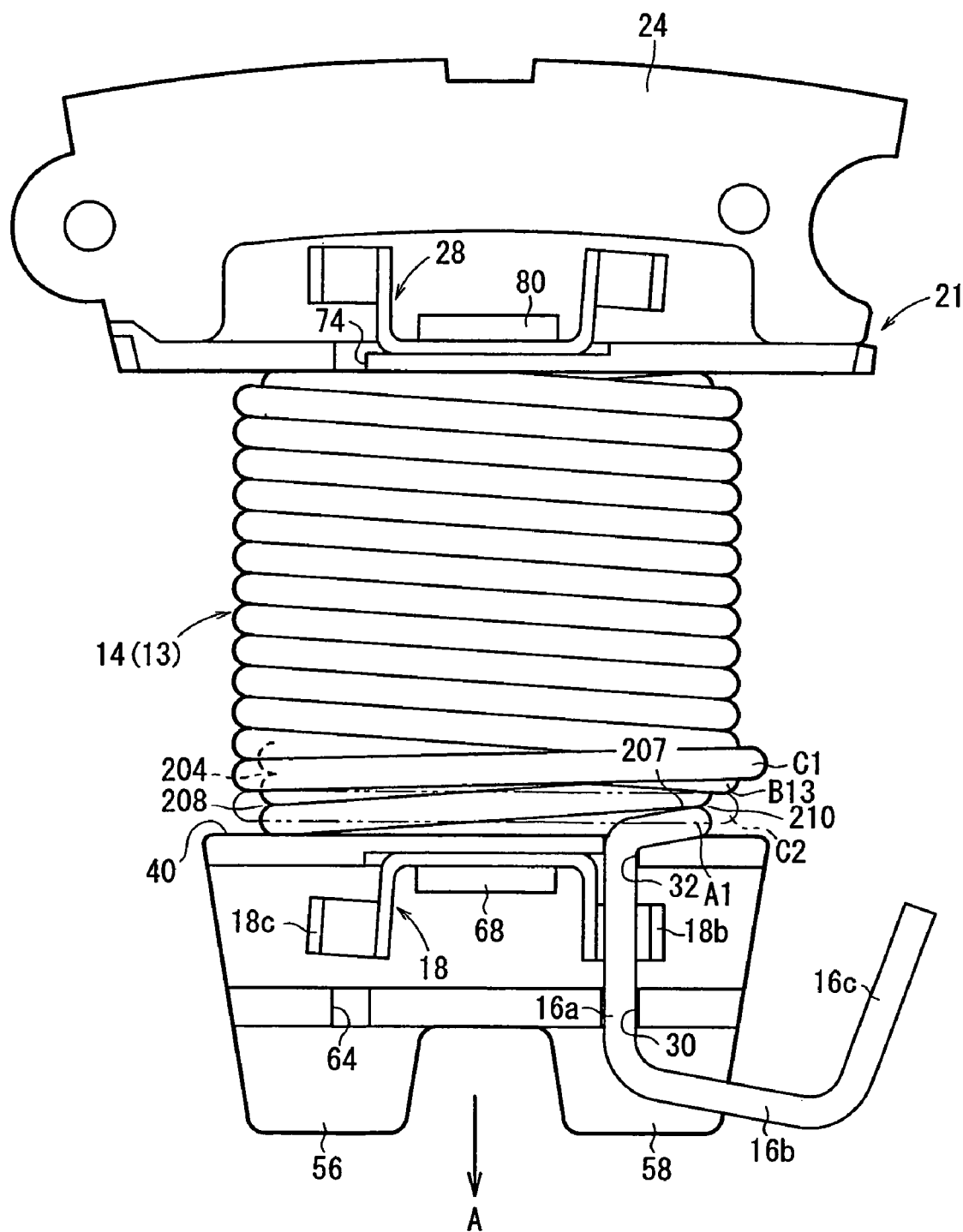
FIG. 11 is a plan view, partly omitted from illustration, showing a process of winding a turn from the second layer to a third layer around the split core.

Then, as shown in FIG. 11, the blank wire 13 is guided from a groove 208 positioned on the left directly below the turn C1 to a groove 210 that is defined on the right by an introduced end 207 of the turn A1 which is introduced from the recess 32 and the turn B13 of the second layer, thus winding the turn C2.

Figure 12:
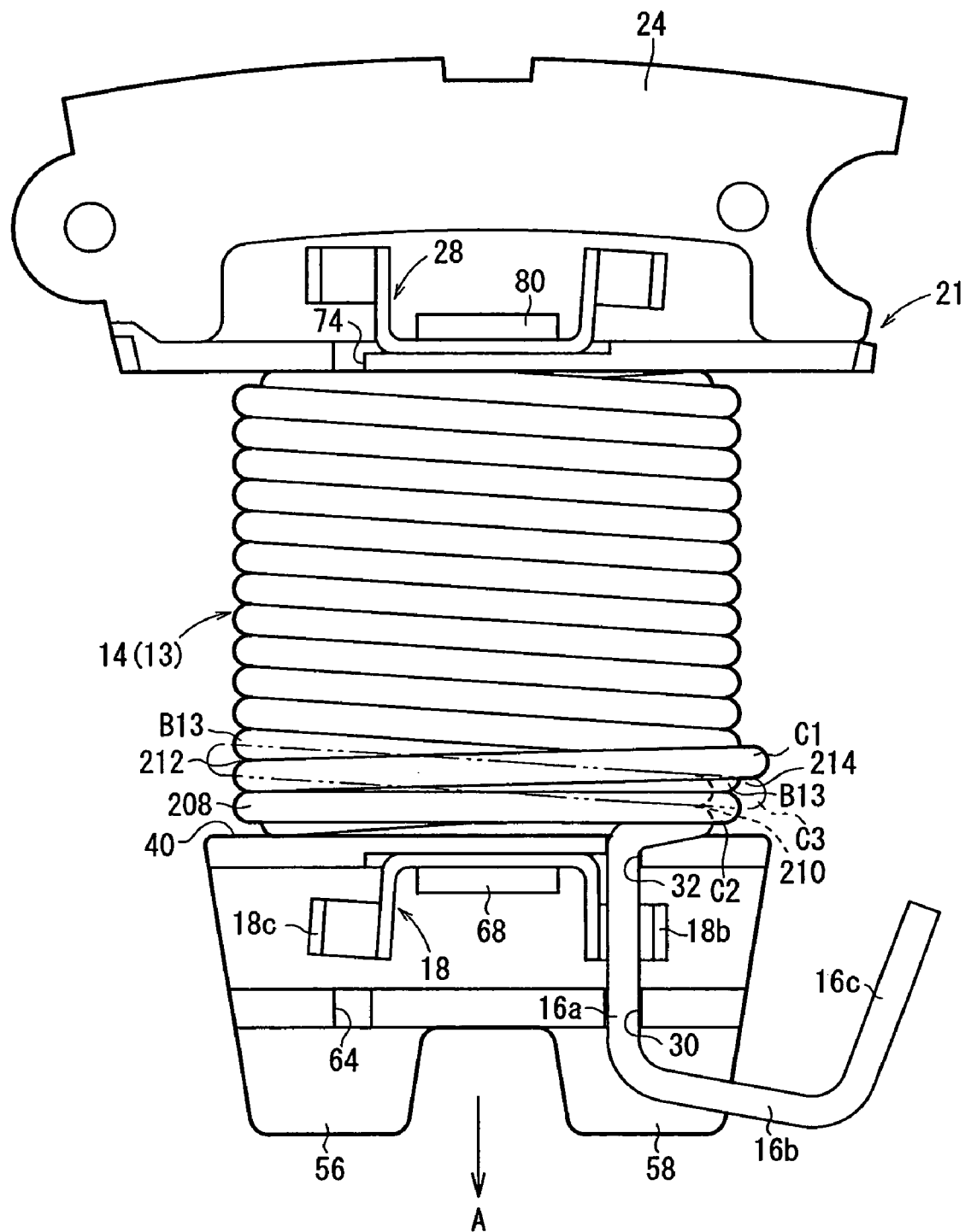
FIG. 12 is a plan view, partly omitted from illustration, showing a process of winding a second turn of the third layer around the split core.

Then, as shown in FIG. 12, the blank wire 13 is guided from an aligning groove 212 which is defined on the left by the turn B13 and the turn C1 to a groove 214 which is defined on the right by the turns C1, C2 of the third layer, thus winding the turn C3.

Figure 13:
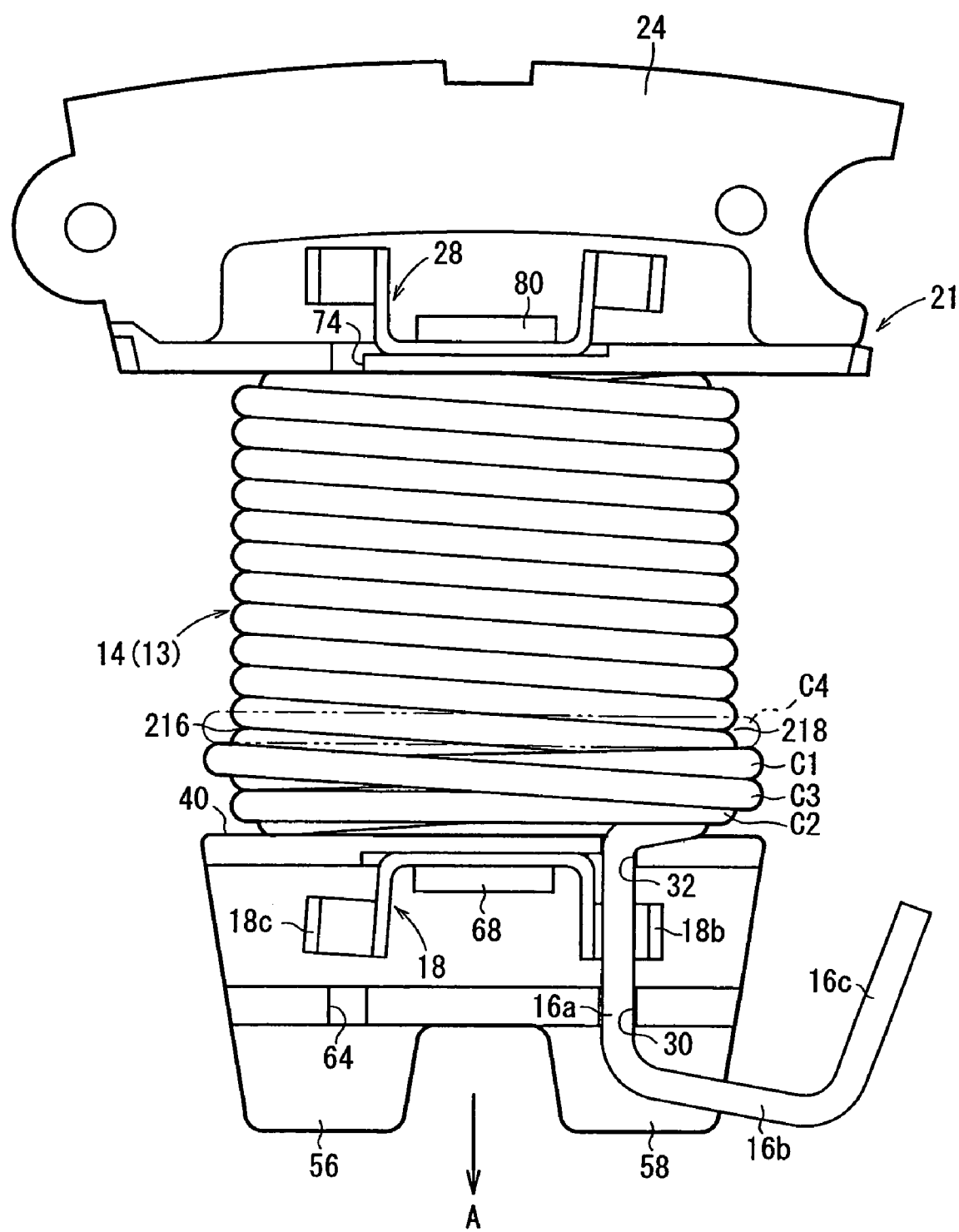
FIG. 13 is a plan view, partly omitted from illustration, showing a process of winding a third turn of the third layer around the split core.

Then, as shown in FIG. 13, the blank wire 13 is guided from a groove 216 which is positioned on the left immediately above the turn C3 to a groove 218 which is positioned on the right immediately above the turn C1, thus winding the turn C4.

Figure 14:
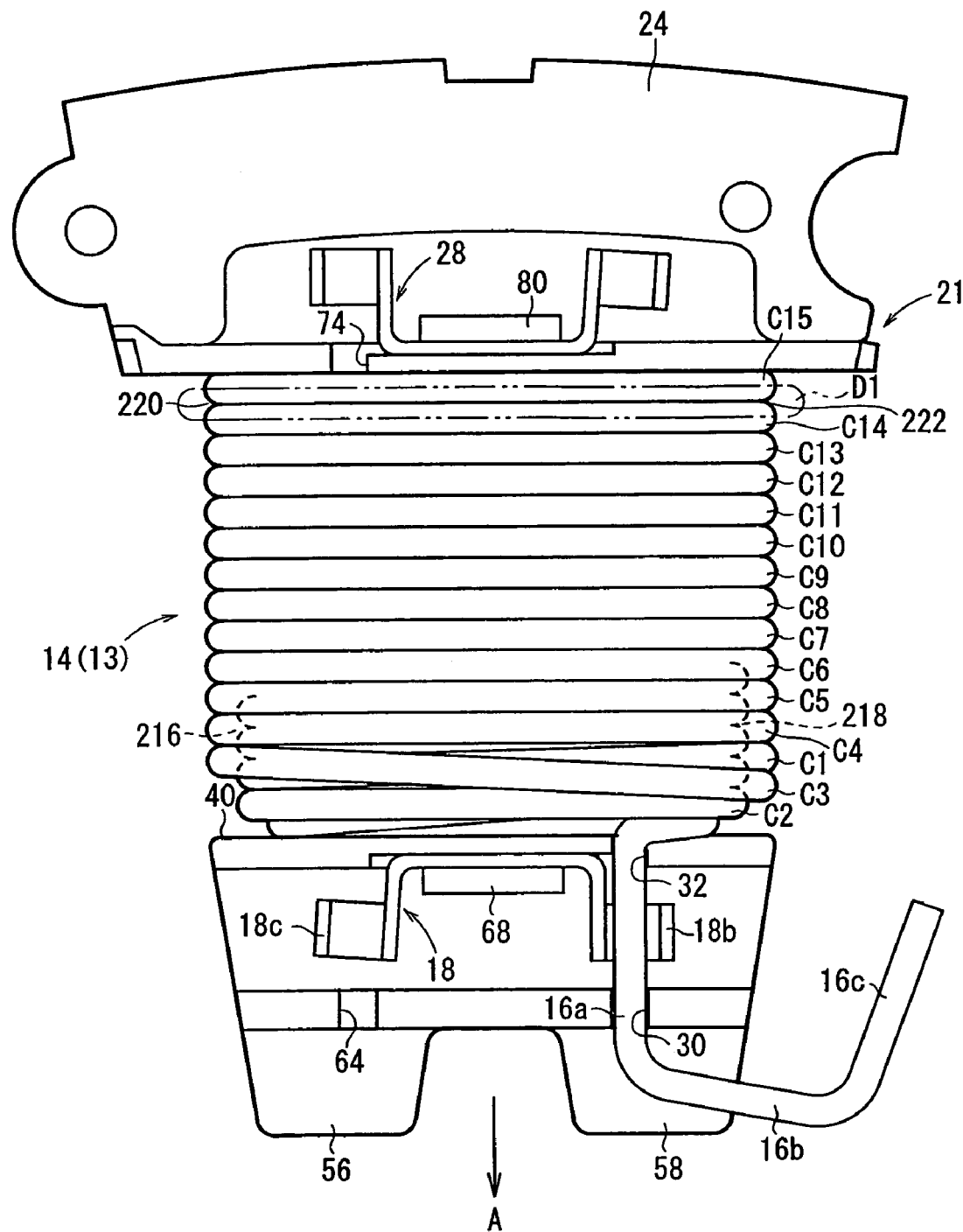
FIG. 14 is a plan view, partly omitted from illustration, showing a process of winding the third layer of turns around the split core.

Thereafter, the turns of the third layer following the turn C4 are wound successively in an array based on the turn C1, until the turn C15 is wound in abutment against the peripheral wall 44 (see FIG. 14).

Figure 15:
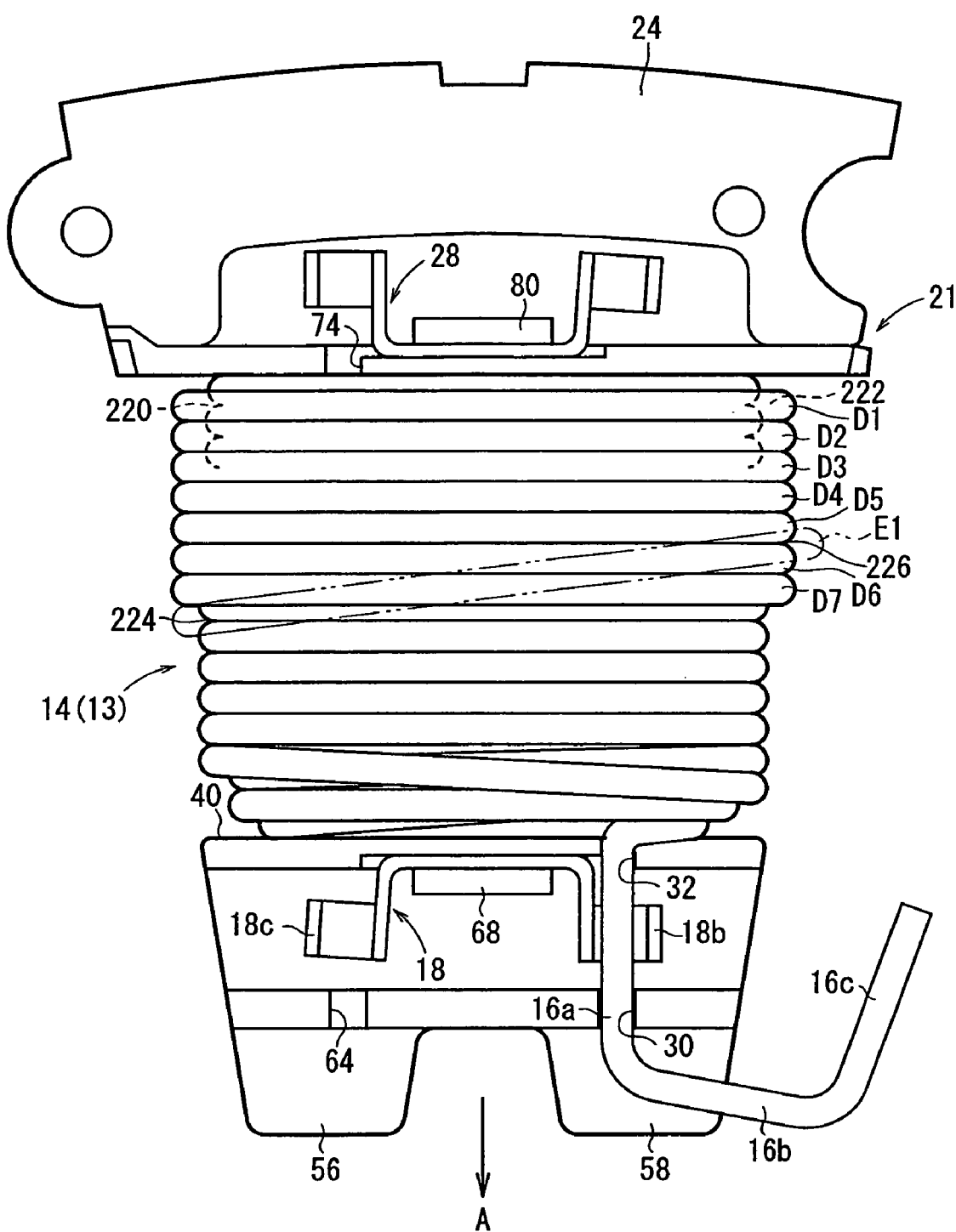
FIG. 15 is a plan view, partly omitted from illustration, showing a process of winding a fourth layer of turns around the split core.

Then, the blank wire 13 is guided from an aligning groove 220 which is defined on the left by the turn C14 and the turn C15 to an aligning groove 222 on the right, starting to wind the turn D1 of the fourth layer. As shown in FIG. 15, the turns of the fourth layer are wound based on the turn D1, until the seventh turn D7 is wound.

Then, the blank wire 13 is guided from a groove 224 which is positioned on the left immediately below the turn D7 to an aligning groove 226 which is defined on the right by the turn D5 and the turn D6, starting to wind the turn E1 of the fifth layer.

Figure 16:
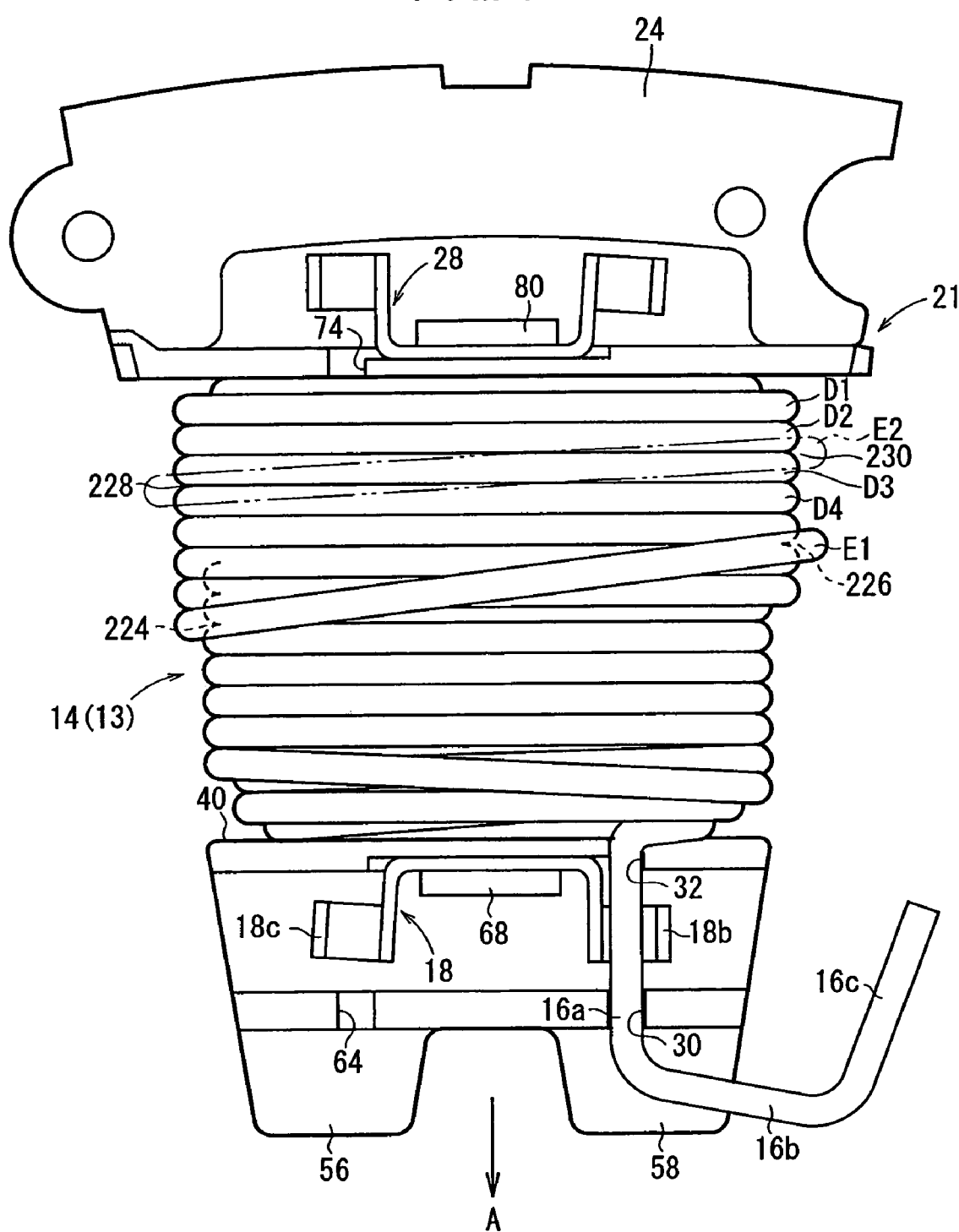
FIG. 16 is a plan view, partly omitted from illustration, showing a process of winding a first turn of a fifth layer around the split core.
Figure 17:
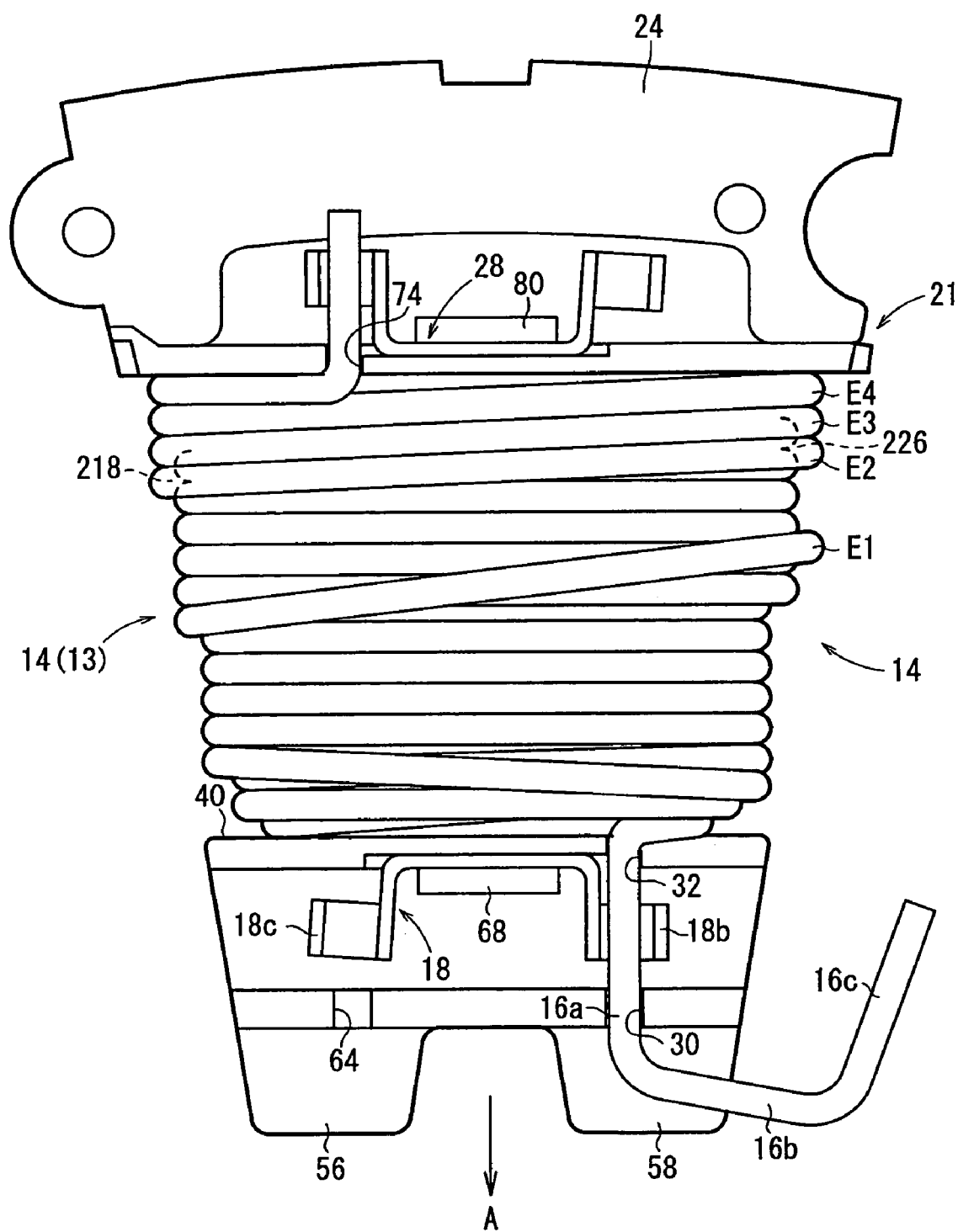
FIG. 17 is a plan view, partly omitted from illustration, showing a process of winding the fifth layer of turns around the split core.

Then, as shown in FIG. 16, the blank wire 13 is guided from an aligning groove 228 which is defined on the left by the turn D3 and the turn D4 to an aligning groove 230 which is defined on the right by the turn D2 and the turn D3, thus winding the turn E2. Thereafter, as shown in FIG. 17, the turns of the fifth layer following the turn E2 are wound successively in an array based on the turn E2, until the turn E4 is wound in abutment against the peripheral wall 44. Subsequently, the blank wire 13 is threaded through the recess 74, and the winding of the coil 14 is finished.

Figure 18:
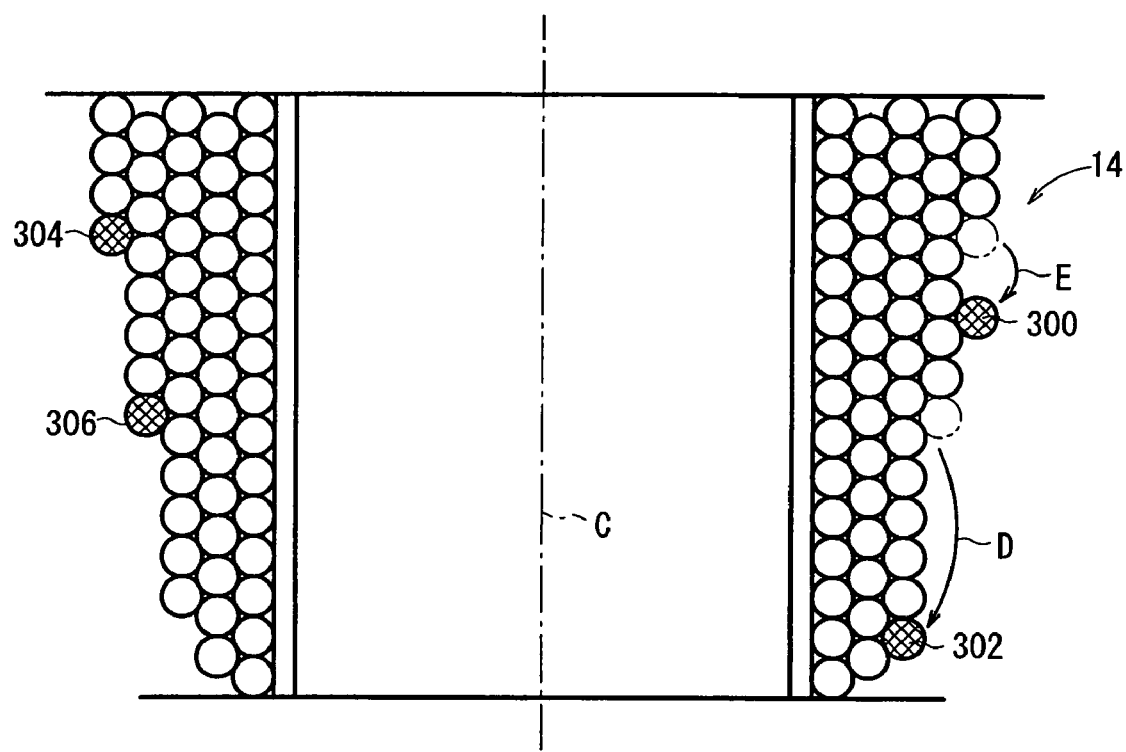
FIG. 18 is a cross-sectional view of the coil in a plane perpendicular to the axis of the stator.

According to the present embodiment, as shown in FIG. 18, the wound coil 14 has a cross-sectional shape which is asymmetrical with respect to the axis C. Specifically, the first layer has fifteen turns on each of its left and right sides and the second layer has fourteen turns on each of its left and right sides, and hence these layers are symmetrical in shape. However, the third layer has fourteen turns on the right side and thirteen turns on the left side, and hence is asymmetrical in shape (see hatched turns 302, 306). Similarly, the fourth layer has seven turns on the right side and eight turns on the left side, and hence is asymmetrical in shape. Accordingly, the third and fourth layers may be counted as having 13.5 turns and 7.5 turns, respectively.

The fifth layer has four turns on each of the left and right sides, but is asymmetrical in shape because hatched turns 300, 304 are turned in different positions on the left and right sides.

Therefore, the coil 14 has an asymmetrical shape with respect to the axis C because of the two different structures, i.e., a structure in which one of the left and right turns of a certain layer is shifted to an adjacent layer, providing a 0.5 turn per layer, and a structure in which the positions of corresponding left and right turns of one layer are shifted.

In FIG. 18, the structure in which one of the left and right turns of a certain layer is shifted to an adjacent layer is conceptually indicated by the arrow D, and the means by which the positions of corresponding left and right turns of one layer are shifted is conceptually indicated by the arrow E.

Figure 19:
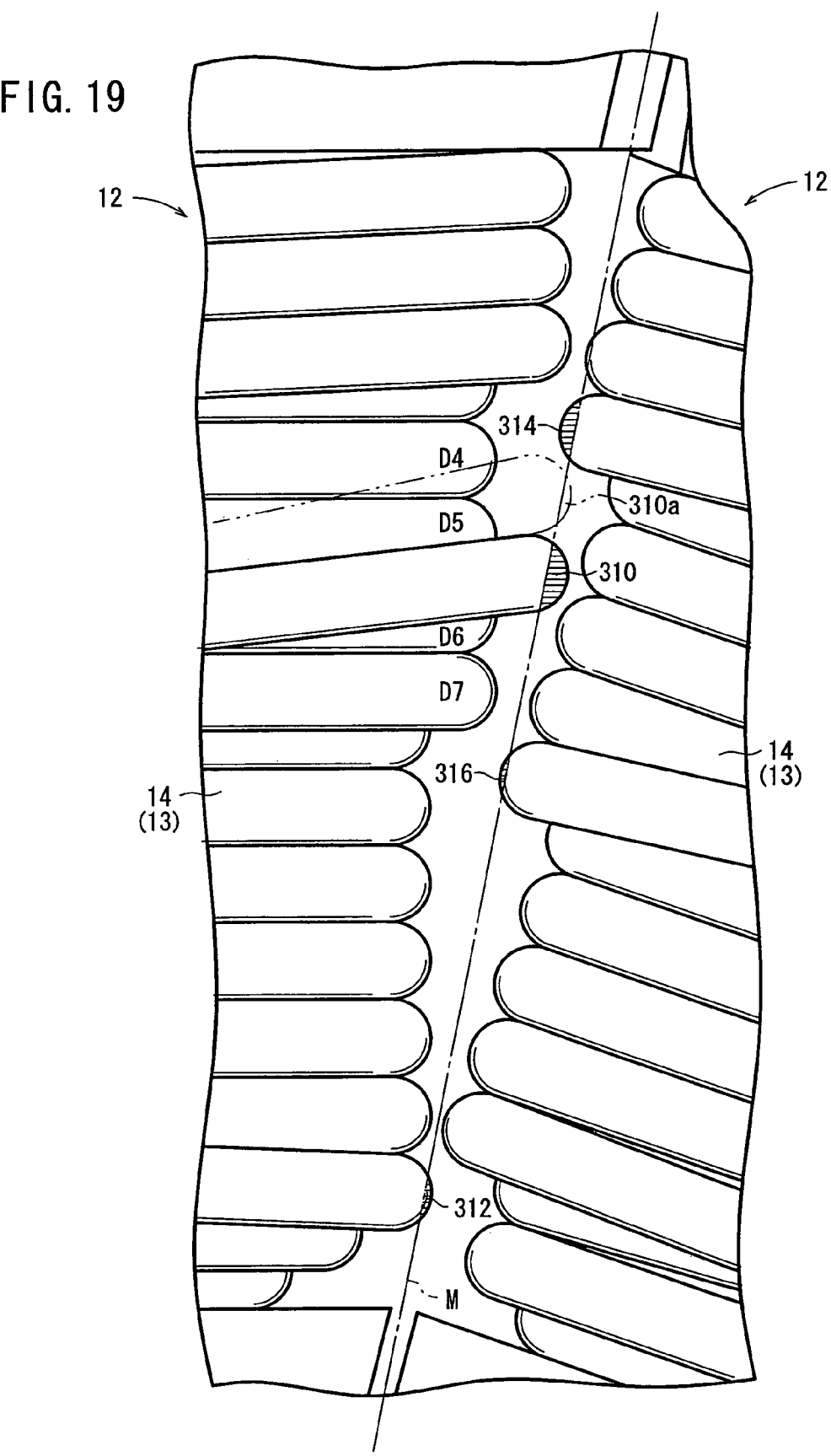
FIG. 19 is an enlarged fragmentary plan view showing the relative positional relationship between adjacent coils with respect to a central line.
Figure 20:
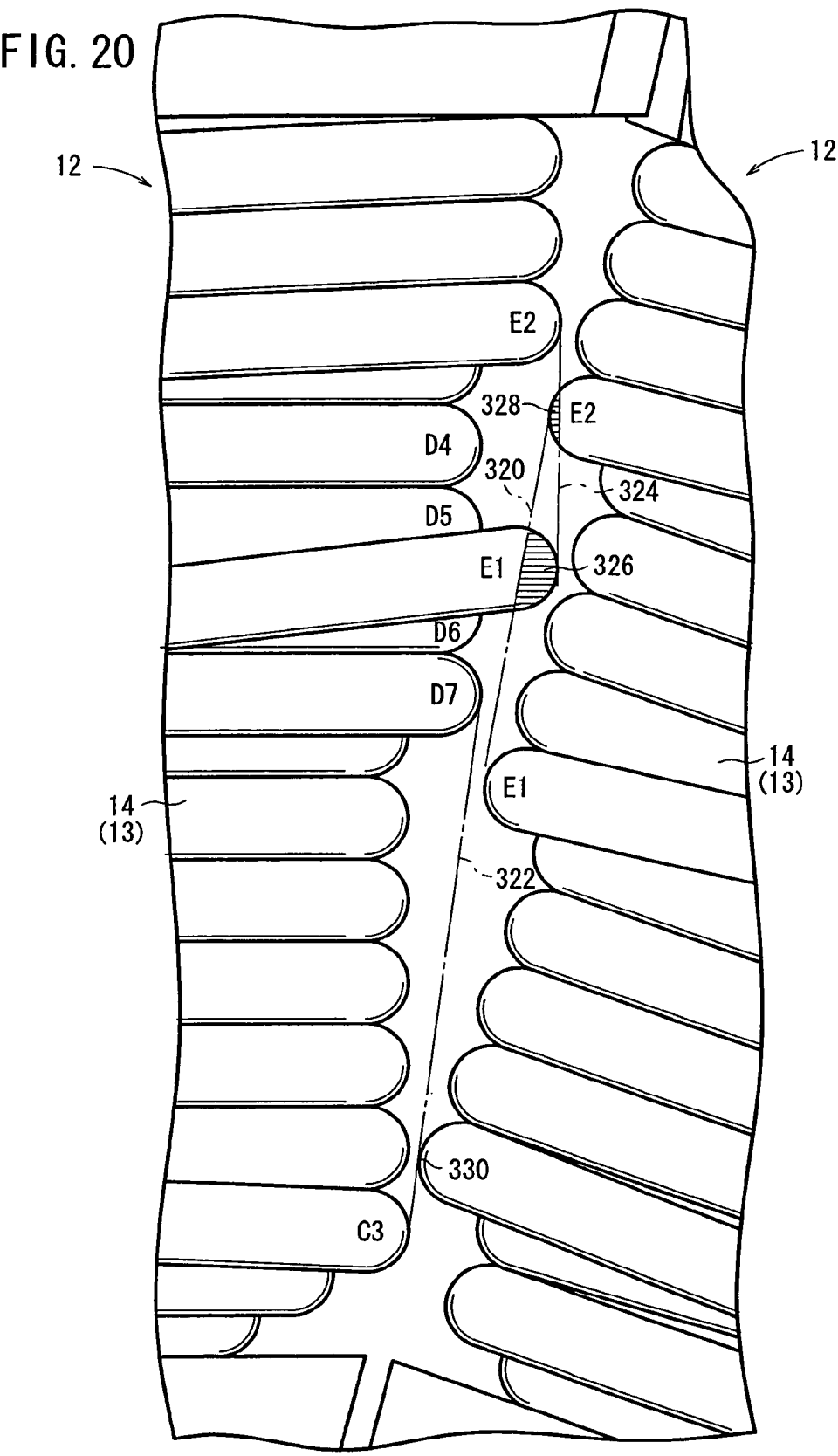
FIG. 20 is an enlarged fragmentary plan view showing the relative positional relationship between adjacent coils with respect to a line tangential to coils.

The relative positional relationship between adjacent split cores 12 at the time coils 14 thus wound are assembled on the stator 10 will be described below with reference to FIGS. 19 and 20. In FIGS. 19 and 20, a region of the split cores 12 is provided for illustrative purposes, and the relative positional relationship will be described based on the region.

As shown in FIG. 19, a medium line or an intermediate line M for providing a region of the split cores 12 is provided for illustrative purposes. The medium line M is provided at a position which divides the angle between the axes C (see FIG. 1) of the respective split cores 12 into two equal angles at the center C (see FIG. 1) of the stator 10.

As can be seen from FIG. 19, the left coil 14 has hatched turn portions 310, 312 extending beyond the medium line M, and the right coil 14 has hatched turn portions 314, 316 extending beyond the medium line M.

The method by which the coil 14 is wound is not limited to the one shown in FIG. 19. However, the hatched turn portion 310 may be wound in an aligning groove defined by the turn D4 and the turn D5, as indicated by the two-dot-and-dash line 310a.

The hatched turn portions 310, 312, 314, 316 shown in FIG. 19 are part of the hatched turns 300, 302, 304, 306, respectively, shown in FIG. 18. It can be understood that the asymmetrical portions of the coil 14 effectively fill dead spaces.

Then, as shown in FIG. 20, tangential lines interconnecting ends of adjacent layers, e.g., a tangential line 320 interconnecting the left ends of the turn E2 and the turn El, and a tangential line 322 interconnecting the right ends of the turn D7 and the turn C3, are provided. Furthermore, a tangential line interconnecting ends of adjacent turns of the same layer, i.e., a tangential line 324 interconnecting the turn E1 and the turn E2 of the fifth layer, provides a region of the split cores 12. With the region of the split cores 12 being thus relatively small, a hatched turn portion 326 of the left coil 14 extends beyond the tangential line 320, and a hatched turn portion 328 of the right coil 14 extends beyond the tangential line 324 and has its vertex 330 held in contact with the tangential line 322.

In this manner, the coils 14 of the respective split cores 12 have portions entering into empty areas of the adjacent split cores 12. Therefore, dead spaces are effectively utilized to increase the volumes that the coils take up. As can be seen from FIGS. 19 and 20, the adjacent coils 14 do not interfere with each other.

A procedure for assembling split cores 12 with coils 14 wound therearound onto the stator 10 will be described below with reference to FIGS. 21 through 23.

Figure 21:
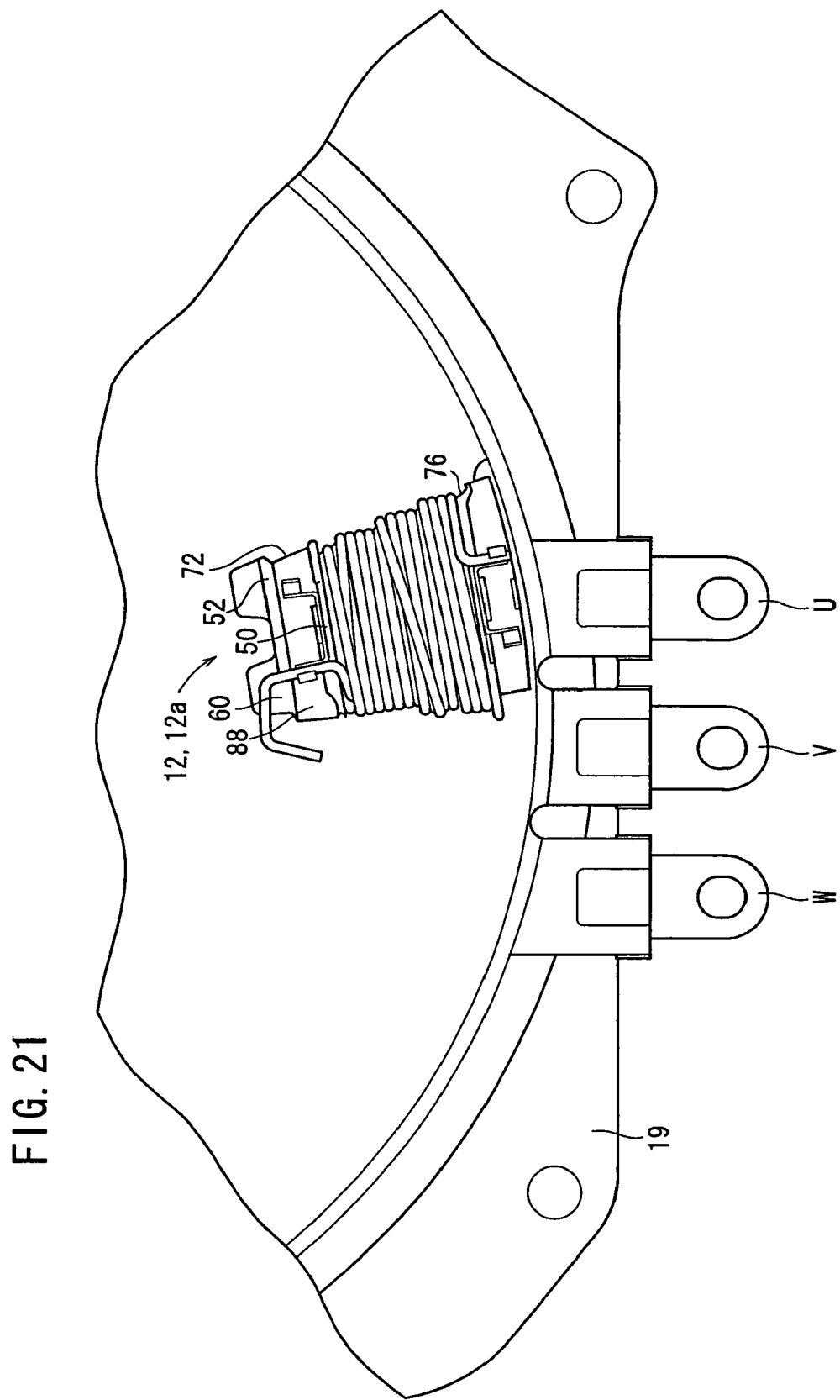
FIG. 21 is a fragmentary plan view of the stator with a split core set in a housing.

First, as shown in FIG. 21, a first split core 12 (distinguished as a split core 12a) is positioned and set in the housing 19.

Figure 22:
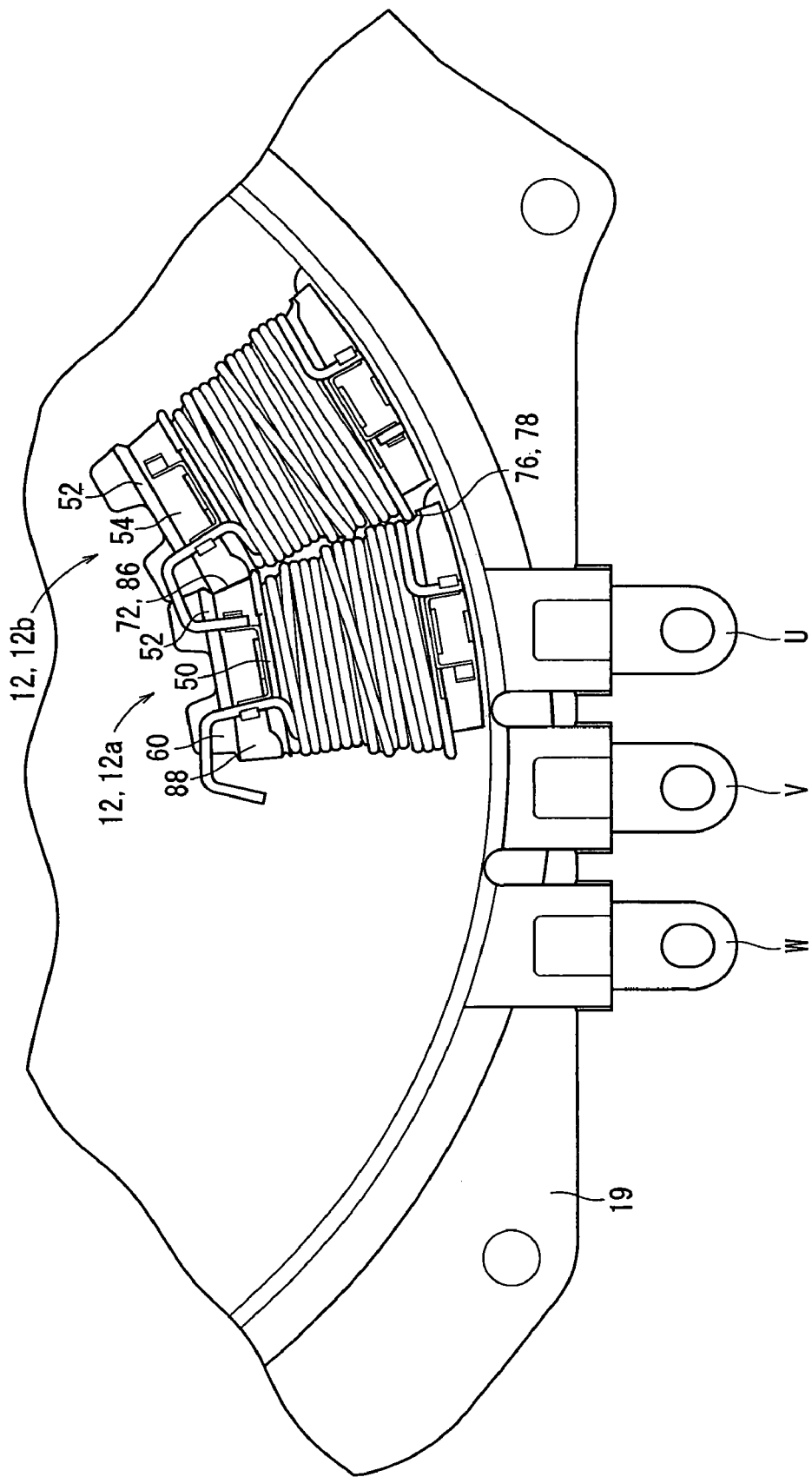
FIG. 22 is a fragmentary plan view of the stator with two split cores set in the housing.

Then, as shown in FIG. 22, a second split core 12 (distinguished as a split core 12b) is set on the right side of the split core 12a, i.e., counterclockwise in FIG. 22. At this time, if the split core 12b is set from above in the housing 19, the third extension 16c of the coil 14 of the split core 12b is positioned on the second fixing portion 18c of the terminal 18 of the split core 12a. The third extension 16c of the coil 14 is thus brought into engagement with the second fixing portion 18c by such a simple insertion process.

At this time, since the dent 86 (see also FIG. 5) of the insulator 21 of the split core 12a fits over the protrusion 72 of the insulator 21 of the split core 12b, the joint surfaces 54, the first upward walls 50, and the second upward walls 52 are held in abutment against each other in partly overlapping relation, providing step-free surfaces across the joint. Thus, in the area where the split cores 12a, 12b are joined together, the first upward walls 50 and the second upward walls 52 of the insulators 21 are joined together without any gaps, forming an annular groove 88.

The process of bringing the third extension 16c into engagement with the second fixing portion 18c and the process of joining the adjacent split core 12b do not need to be carried out simultaneously. After the third extension 16c is brought into engagement with the second fixing portion 18c, the split core 12b may be joined.

Thereafter, another split core 12 is joined to the left side of the split core 12b according to the same procedure as descried above, and then other split cores are successively joined until a seventeenth split core 12 (distinguished as a split core 12q, see FIG. 23) is joined.

Figure 23:
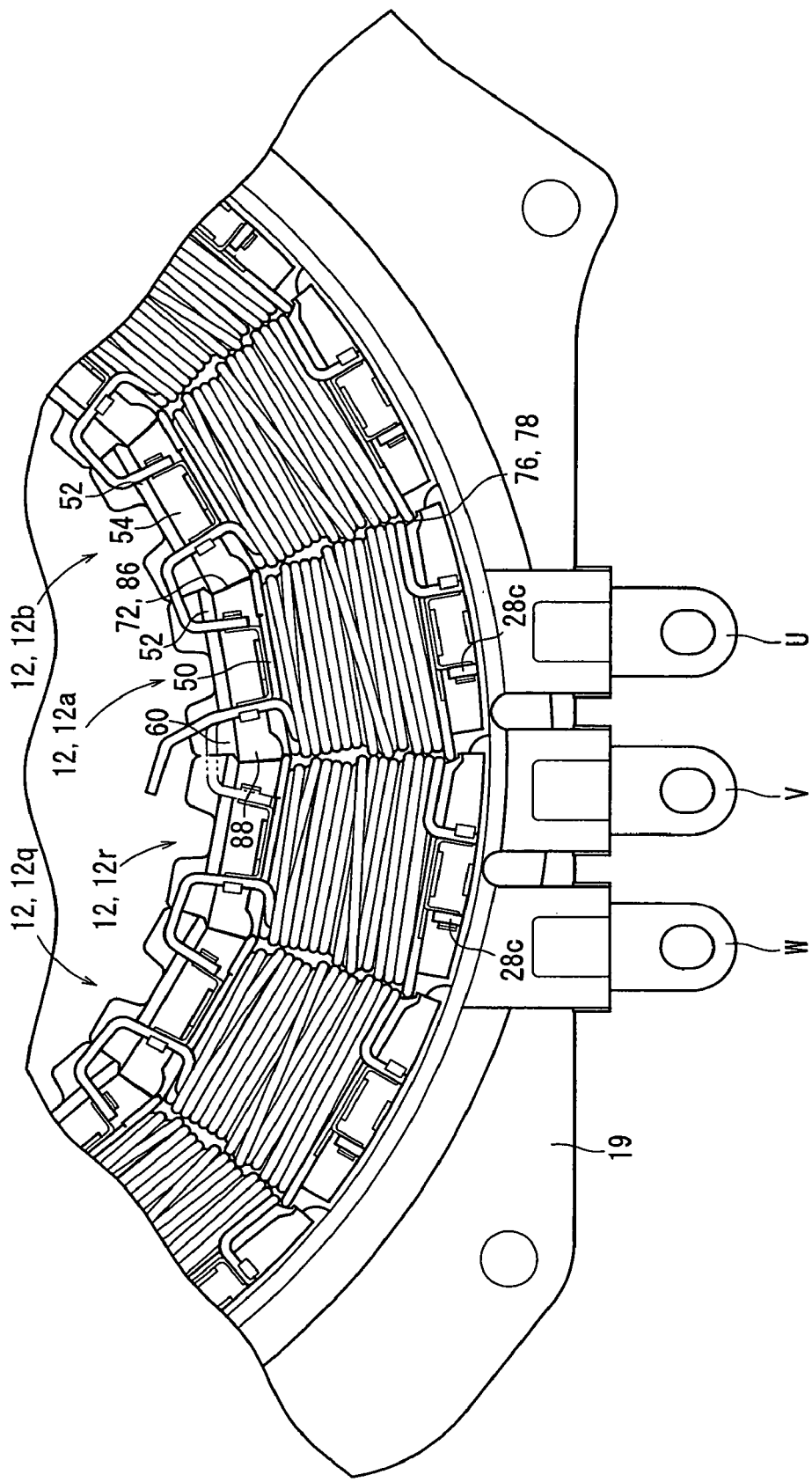
FIG. 23 is a fragmentary plan view of the stator with eighteen split cores set in the housing.

Then, as shown in FIG. 23, a final split core 12 (distinguished as a split core 12r) is set between the split core 12q and the split core 12a. At this time, the extension 16 of the coil 14 of the split core 12a is retracted out of interference with the split core 12r.

After the split core 12r is set, the extension 16 of the coil 14 of the split core 12a is returned to its original position and brought into engagement with the second fixing portion 18c of the split core 12r.

The split cores 12 do not need to be directly mounted in the housing 19, but may be mounted on a holder or a ring and thereafter pressed into the housing 19.

When the eighteen split cores 12 are joined together, the annular groove 88 is completed.

Then, the first extensions 16a of the coils 14 and the first fixing portions 18b of the terminals 18 are connected. The third extensions 16c of the coils 14 and the second fixing portions 18c of the terminals 18 are connected. Specifically, the first fixing portion 18b is pressed with heat against the first extension 16a, melting away the insulation cover on the first extension 16a and electrically connecting the copper wire of the first extension 16a to the first fixing portion 18b.

The third extension 16c and the second fixing portion 18c are similarly connected to each other by thermal compression. The second fixing portions 28c of the terminals 28 on the radially outer sides of the split cores 12 are also connected to the input line bus bar in the same manner as described above.

The coils 14 thus have common lines connected to each other through the terminals 18. Since the terminals 18 are part of the split cores 12, no separate connecting parts are necessary to connect the coils 14. As dedicated separate parts such as common line bus bars or printed circuit boards are not required, the connecting procedure can easily be performed, and the coils 14 can be connected with reduced man-hours.

With the rotary electric machine according to the present embodiment, as described above, the volume that the coils 14 take up can be increased by using only one type of coils 14. If the blank wire 13 has a large diameter, in particular, then the steps between adjacent layers of the coils 14 and the gaps between adjacent turns are large. However, dead spaces produced by thus steps and gaps can effectively be filled.

Inasmuch as the split cores 12 are of one type, the winding apparatus and the winding process may also be of one type. Therefore, the cost of the facility and the number of manufacturing steps can be reduced, making it easier to perform manufacturing control and inventory control.

The basic structure of the split cores 12 is applicable regardless of the number of poles of rotary electric machines. For example, it is applicable to rotary electric machines having an odd number of poles.

The stator 10 may not necessarily be of a split structure, but may have an integral core (or stator) having a plurality of radially projecting poles, around which the coils 14 may directly be wound.

The rotary electric machine according to the present invention is not limited to the above embodiment, but may employ various structures without departing from the scope of the invention.

INDUSTRIAL APPLICABILITY

As described above, the rotary electric machine according to the present invention has coils that take up an increased volume with respect to cores, thereby lowering the cost of a facility, reducing the number of assembling steps, and facilitating inventory control.

The invention claimed is:

1. A rotary electric machine having a stator having an annular array of poles with respective coils wound therearound, wherein,
    each of said coils is wound in an asymmetrical cross-sectional shape with respect to said poles in a plane perpendicular to the axis of said stator, and
    wherein one of adjacent ones of said coils has a portion extending beyond or held in contact with a tangential line interconnecting ends of adjacent layers of the other one of said adjacent ones of said coils, in the plane perpendicular to the axis of said stator.

2. A rotary electric machine according to claim 1, wherein said asymmetrical cross-sectional shape of each of said coils is formed by shifting at least one of turns of said each coil to an adjacent layer thereof.

3. A rotary electric machine according to claim 2, wherein said asymmetrical cross-sectional shape of each of said coils is formed by winding said turns successively along aligning grooves defined between said turns.

4. A rotary electric machine according to claim 2, wherein when each of said coils having a plurality of layers each comprising said turns is formed, said turns are wound across said layers.

5. A rotary electric machine according to claim 1, wherein said asymmetrical cross-sectional shape of each of said coils is formed by making the positions of turns of said each coil asymmetrical.

6. A rotary electric machine according to claim 5, wherein said asymmetrical cross-sectional shape of each of said coils is formed by winding said turns successively along aligning grooves defined between said turns.

7. A rotary electric machine according to claim 5, wherein when each of said coils having a plurality of layers each comprising said turns is formed, said turns are wound across said layers.

8. A rotary electric machine having a stator having an annular array of poles with respective coils wound therearound. wherein,
  each of said coils is wound in an asymmetrical cross-sectional shape with respect to said poles in a plane perpendicular to the axis of said stator and wherein one of adjacent ones of said coils has a portion extending beyond or held in contact with a tangential line interconnecting ends of adjacent turns of the same layer of the other one of said adjacent ones of said coils, in the plane perpendicular to the axis of said stator.

9. A rotary electric machine according to claim 8, wherein said asymmetrical cross-sectional shape of each of said coils is formed by shifting at least one of turns of said each coil to an adjacent layer thereof.

10. A rotary electric machine according to claim 9, wherein said asymmetrical cross-sectional shape of each of said coils is formed by winding said turns successively along aligning grooves defined between said turns.

11. A rotary electric machine according to claim 9, wherein each of said coils having a plurality of layers each comprising said turns is formed, said turns are wound across said layers.

12. A rotary electric machine according to claim 8, wherein said asymmetrical cross-sectional shape of each of said coils is formed by making the positions of turns of said each coil asymmetrical.

13. A rotary electric machine according to claim 12, wherein said asymmetrical cross-sectional shape of each of said coils is formed by winding said turns successively along aligning grooves defined between said turns.

14. A rotary electric machine according to claim 12, wherein each of said coils having a plurality of layers each comprising said turns is formed, said turns are wound across said layers.

* * * * *